United States Patent
Wolf et al.

(10) Patent No.: US 9,287,757 B2
(45) Date of Patent: Mar. 15, 2016

(54) METHOD FOR PRODUCING A STATOR WINDING OF AN ELECTRIC MACHINE, IN PARTICULAR FOR PRODUCING AN ALTERNATOR

(75) Inventors: Gert Wolf, Affalterbach (DE); Eberhard Rau, Korntal-Muenchingen (DE); Alexander Mueller, Stuttgart (DE); Kurt Reutlinger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1045 days.

(21) Appl. No.: 13/375,181

(22) PCT Filed: May 31, 2010

(86) PCT No.: PCT/EP2010/057540
§ 371 (c)(1),
(2), (4) Date: Feb. 21, 2012

(87) PCT Pub. No.: WO2010/136603
PCT Pub. Date: Dec. 2, 2010

(65) Prior Publication Data
US 2012/0139383 A1    Jun. 7, 2012

(30) Foreign Application Priority Data
May 29, 2009    (DE) .......................... 10 2009 024 230

(51) Int. Cl.
| H02K 15/00 | (2006.01) |
| H02K 15/085 | (2006.01) |
| H02K 3/28 | (2006.01) |
| H02K 15/04 | (2006.01) |
| H02K 15/06 | (2006.01) |

(52) U.S. Cl.
CPC ............... H02K 15/085 (2013.01); H02K 3/28 (2013.01); H02K 15/045 (2013.01); H02K 15/066 (2013.01); Y10T 29/49009 (2015.01)

(58) Field of Classification Search
CPC ......... H02K 3/28; H02K 3/12; H02K 15/024; H02K 15/0056; H02K 15/095; H02K 1/165; H02K 15/085; H02K 1/16; H02K 15/02; H02K 19/34; H02K 17/08; H02K 3/34

USPC ................ 29/596, 564.1, 598, 605, 606, 732; 310/179, 184, 198, 202, 208, 215
See application file for complete search history.

(56) References Cited

U.S. PATENT DOCUMENTS

| 7,923,883 | B2* | 4/2011 | Yamaguchi et al. .......... 310/179 |
| 8,294,324 | B2* | 10/2012 | Ishigami et al. ............. 310/206 |
| 2004/0216302 | A1 | 11/2004 | Kreuzer et al. |
| 2008/0201935 | A1 | 8/2008 | Nakayama et al. |

FOREIGN PATENT DOCUMENTS

| DE | 10329572 | 1/2005 |
| DE | 102005048094 | 4/2007 |
| WO | 0154254 | 7/2001 |

OTHER PUBLICATIONS

PCT/EP2010/057540 International Search Report.

* cited by examiner

*Primary Examiner* — Thiem Phan
(74) *Attorney, Agent, or Firm* — Michael Best & Friedrich LLP

(57) ABSTRACT

The invention relates to a method for producing a stator winding (18) of an electric machine (10), in particular of an alternator, the stator winding (18) comprising at least n phase windings (120, 121, 122, 123, 124) and a phase winding (120, 121, 122, 123, 124) having several directly consecutively wound coils (82) having coil sides (88) and coil side connectors (91), the coils (82) being divided into first coils (82.1) and second coils (82.2), by means of a forming tool (100), in which grooves (105, 106; 105', 106') suitable for accommodating the coils (82) are provided, a first coil (82.1) being arranged in one groove (105; 105') and a second coil (82.2) being arranged in another groove (105; 105'), characterized in that n–1 grooves (105, 106; 105', 106') are arranged between the first coil (82.1) and the second coil (82.2).

11 Claims, 25 Drawing Sheets

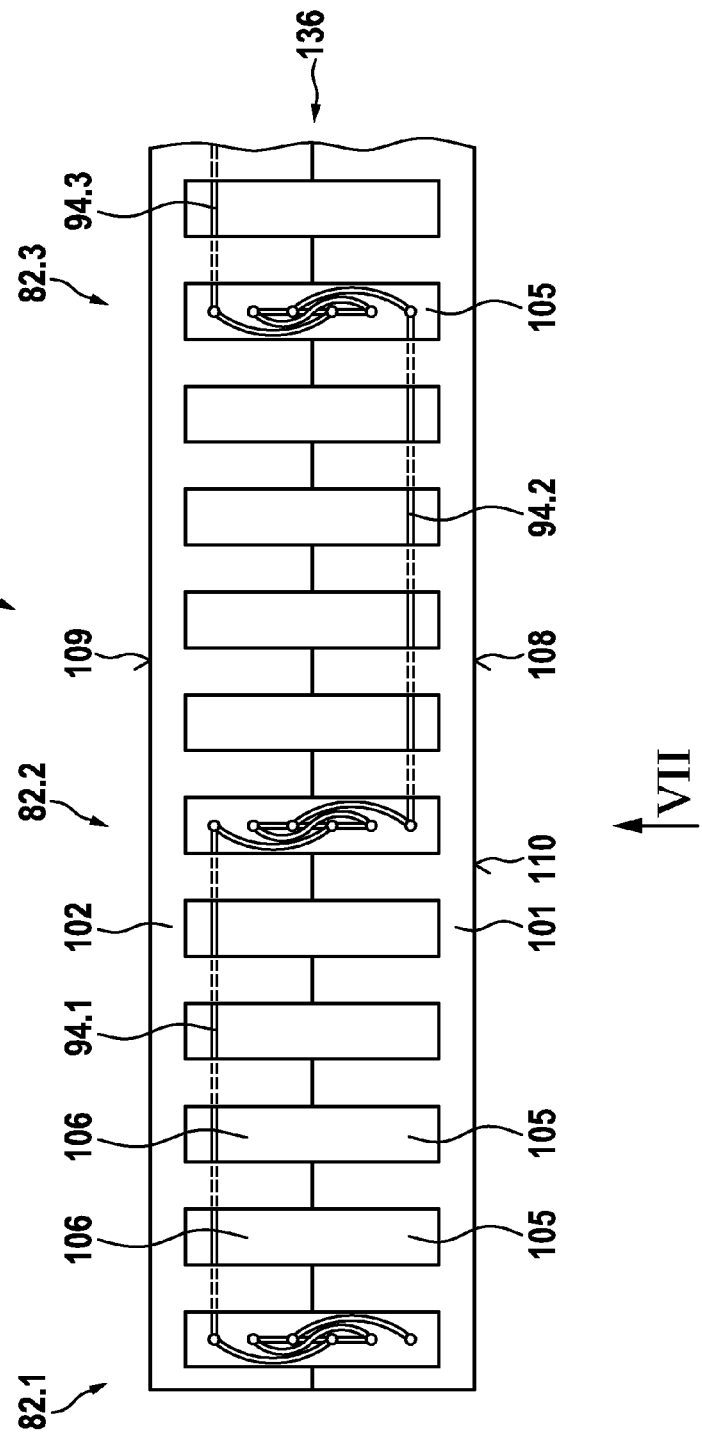

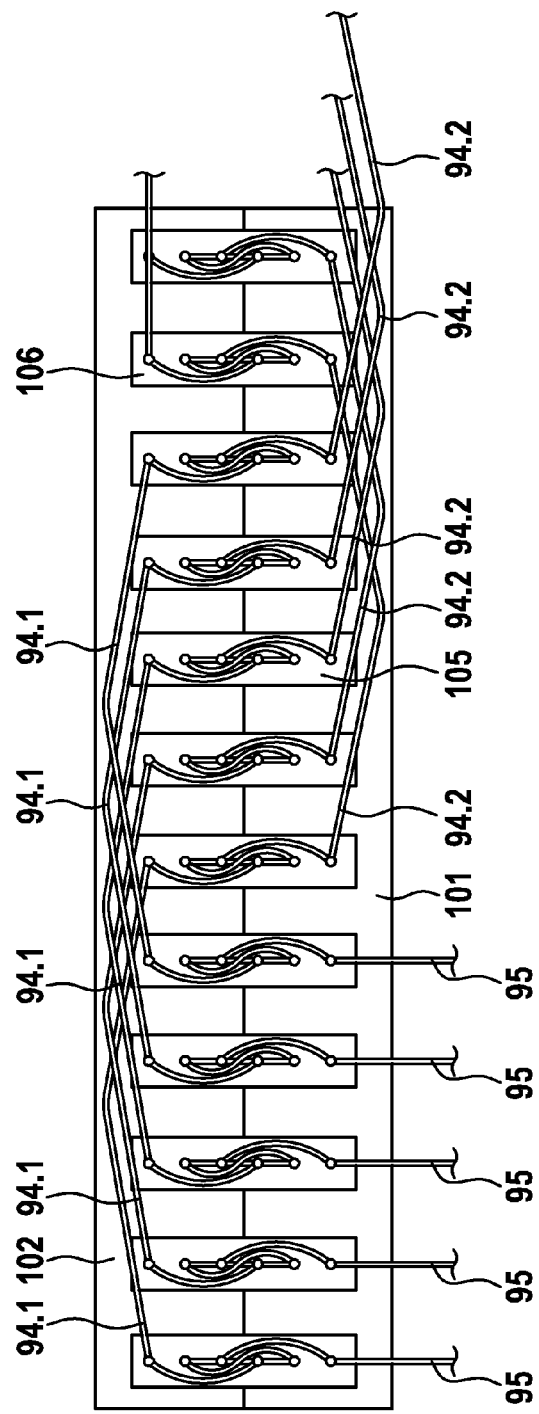

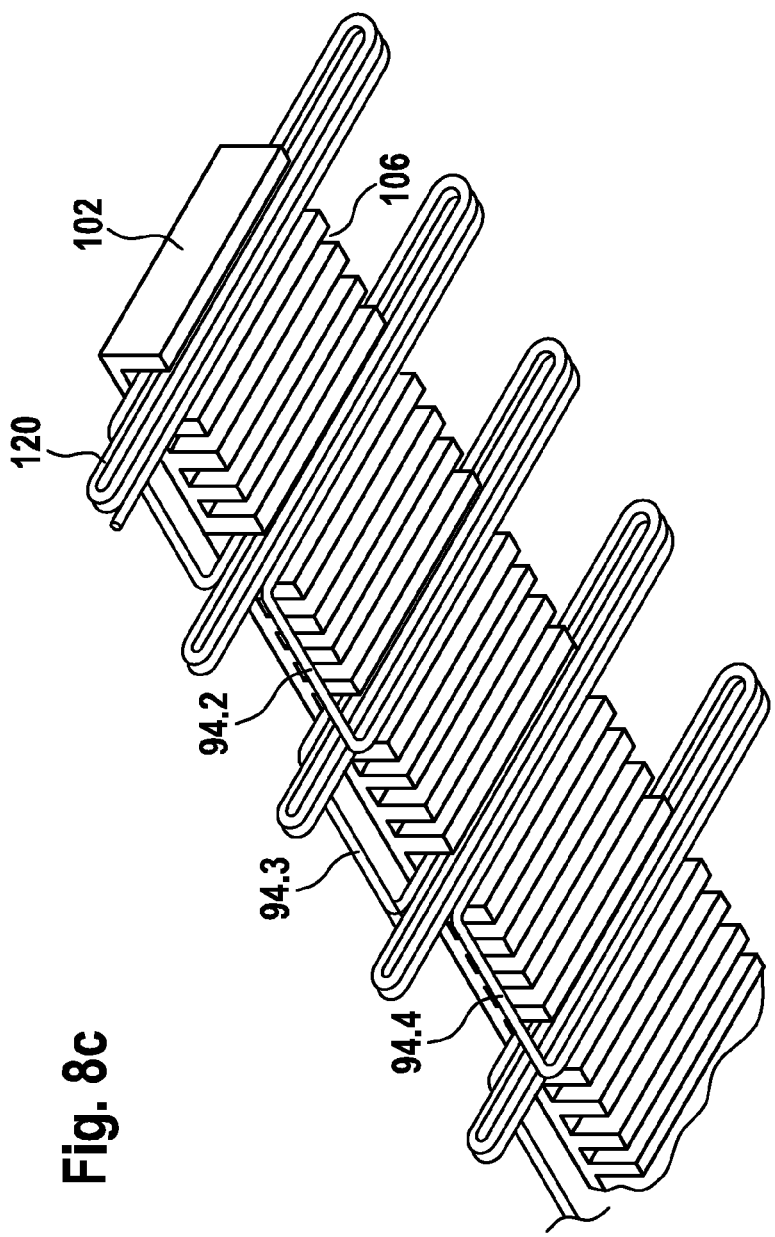

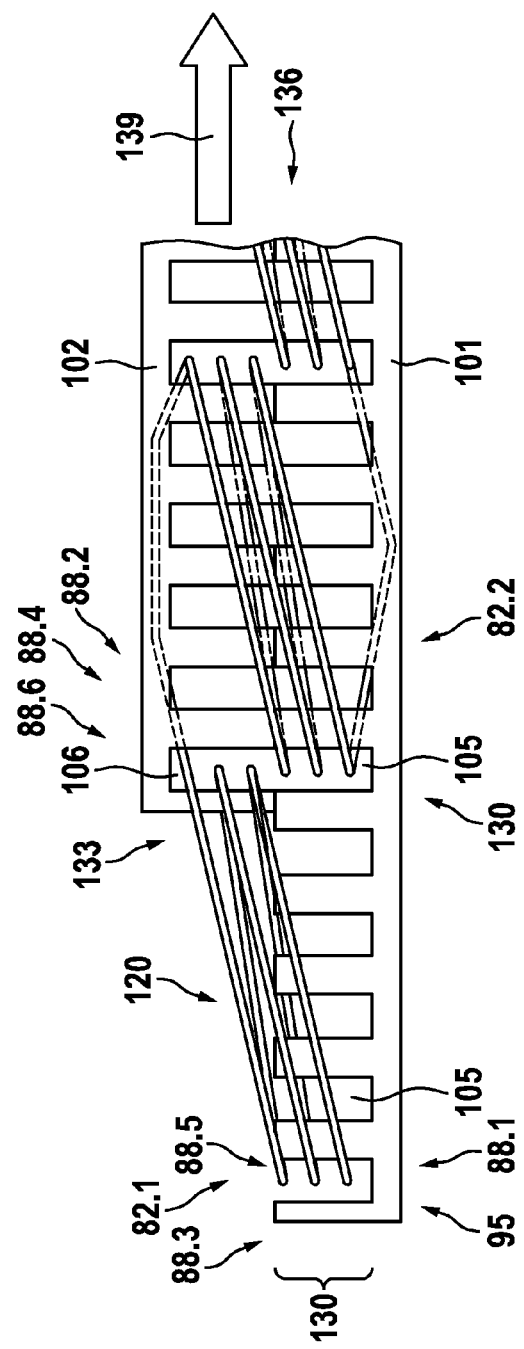

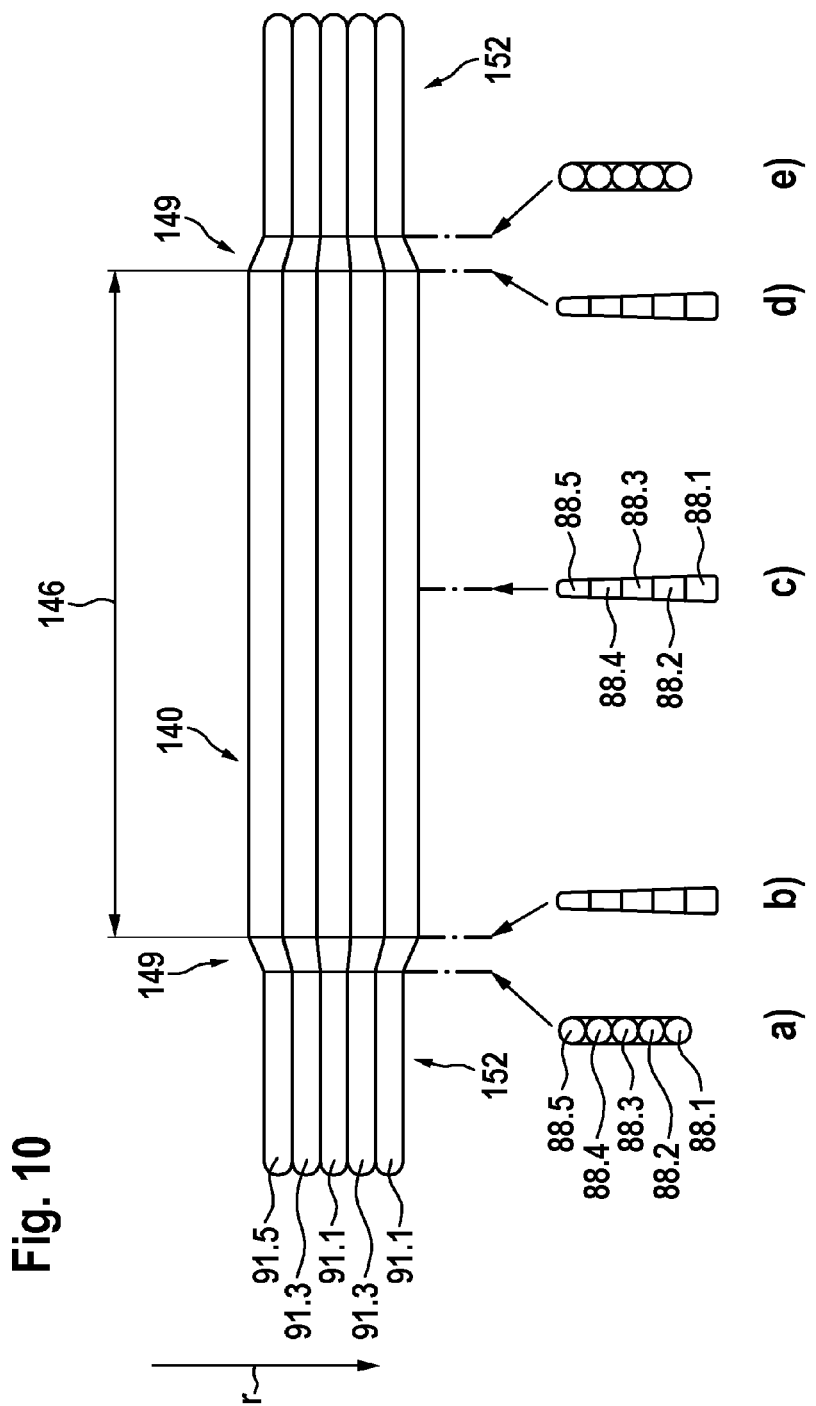

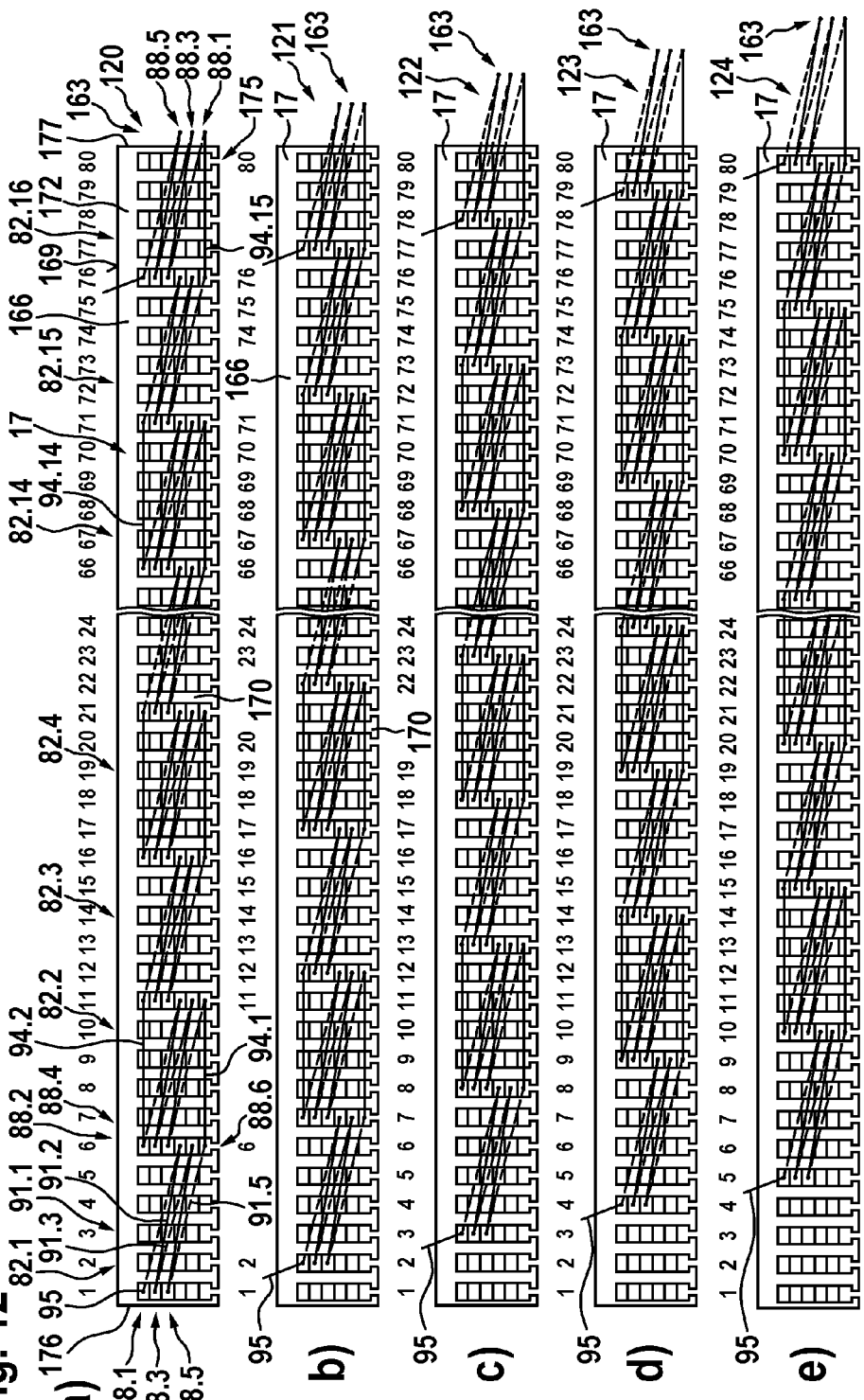

METHOD FOR PRODUCING A STATOR WINDING OF AN ELECTRIC MACHINE, IN PARTICULAR FOR PRODUCING AN ALTERNATOR

BACKGROUND OF THE INVENTION

DE 103 29 572 A1 discloses a method for producing a core which can be excited electromagnetically and for whose production a specific stator winding is used. In comparison to the stator winding disclosed and produced there, the invention provides for the axial extent of the coil side connectors to be reduced, and therefore for the axial extent of the stator winding to be shortened. In this case, the term "axial" relates to a rotation axis of a rotor of the electrical machine.

SUMMARY OF THE INVENTION

Advantages of the Invention

The method according to the invention for producing a stator winding of an electrical machine has the advantage that a continuous stator winding, which consists of one wire, and whose axial extent or axial length is relatively short can be produced in a relatively simple manner in this way.

Good matching to the widely different electrical and electromagnetic requirements can be achieved in that each coil has an even or odd number of turns. This also applies to the situation in which one coil has an even number of turns and another coil has an odd number of turns.

In one aspect of the invention, coils of a phase winding are shaped after winding of turns such that the coil sides of one coil are arranged at least virtually on a plane. This results in the coil side connectors being axially shortened to a particularly major degree, with the axial length of the winding correspondingly being particularly short. The stamping of the coil sides of a coil in a stamping tool results in the capability to fill the slots in the stator core particularly well, and the slot filling factor (copper cross section of the conductors with respect to the cross section of the slot) is accordingly particularly high. This improves the cooling of the stator core and of the stator and the level of space utilization (high electrical output power per physical volume).

In one aspect of the invention, two directly adjacent coils of a phase winding have a coil connector between them, which coil connector is connected integrally to the two directly adjacent coils, wherein one coil and the other coil are each rotated through an amount of essentially 90 angular degrees with respect to the coil connector, with the rotation directions being mutually opposite. This makes it possible to ensure that the slot cross section can be chosen particularly freely. For example, it is possible for the coil sides at that end of the slot which is open radially inward to assume a trapezoidal cross section overall, while the other coil sides, which are arranged between a yoke than the other coil sides just mentioned, are in fact stamped to be rectangular.

In one aspect of the invention, one or more phase windings are inserted into slots of a shaping tool, and in that one group of the coil sides is shifted with respect to another group of the coil sides of the same coil and is shaped such that n−1 slots are arranged between the two groups of the coil sides. This has the advantage that, on the one hand, the coil sides close to the yoke can be stamped independently of the coil sides on the slot side. In the final analysis, this means that the stamped coil sides can be removed from the stamping tool more easily. In contrast to this, joint stamping of the coil sides which are intended to be located in one slot has the advantage that this is done at a relatively late time and, in consequence, the handling of the slots once they have been stamped is simpler.

In one aspect of the invention, the shaping tool has a lower part, which is provided with slots, and an upper part, which is provided with slots, with the slots having either the same slot depth or different slot depths. This allows the individual wire sections to assume a defined position with respect to one another.

In one aspect of the invention, the coil sides of a coil are stamped in a stamping tool. This chosen arrangement results in a less complex end winding, thus avoiding excessive flow noise in the electrical machine.

In one aspect of the invention, different coil sides are stamped differently. The result is that time is saved in manufacture.

In one aspect of the invention, the coil sides are stamped after winding or after movement. The advantage of the first alternative is that the shaping tool can already be virtually closed, thus allowing the coils and coil sides to be inserted into the shaping tool without further sorting problems. The advantage of the second alternative is that the individual phase windings can be inserted into the tool successively, without the individual phase windings impeding one another in the process.

BRIEF DESCRIPTION OF THE DRAWINGS

The invention will be explained in more detail in the following text using the figures, by way of example, in which:

FIG. 6a shows an initial stage of a phase winding in a shaping tool, FIG. 8a shows, schematically, the position of all the phase windings inserted into the shaping tool, FIG. 8c shows an alternative to the insertion method shown in FIG. 8b, FIG. 9 shows a side view of the shaping tool after the restriction, FIG. 10 shows a schematic illustration of a side view of an area inserted into slots in a stator core, FIGS. 12a to e show the position of the five phase windings in the stator core, with the individual phase windings having six conductors per slot.

DETAILED DESCRIPTION

Figure 1:
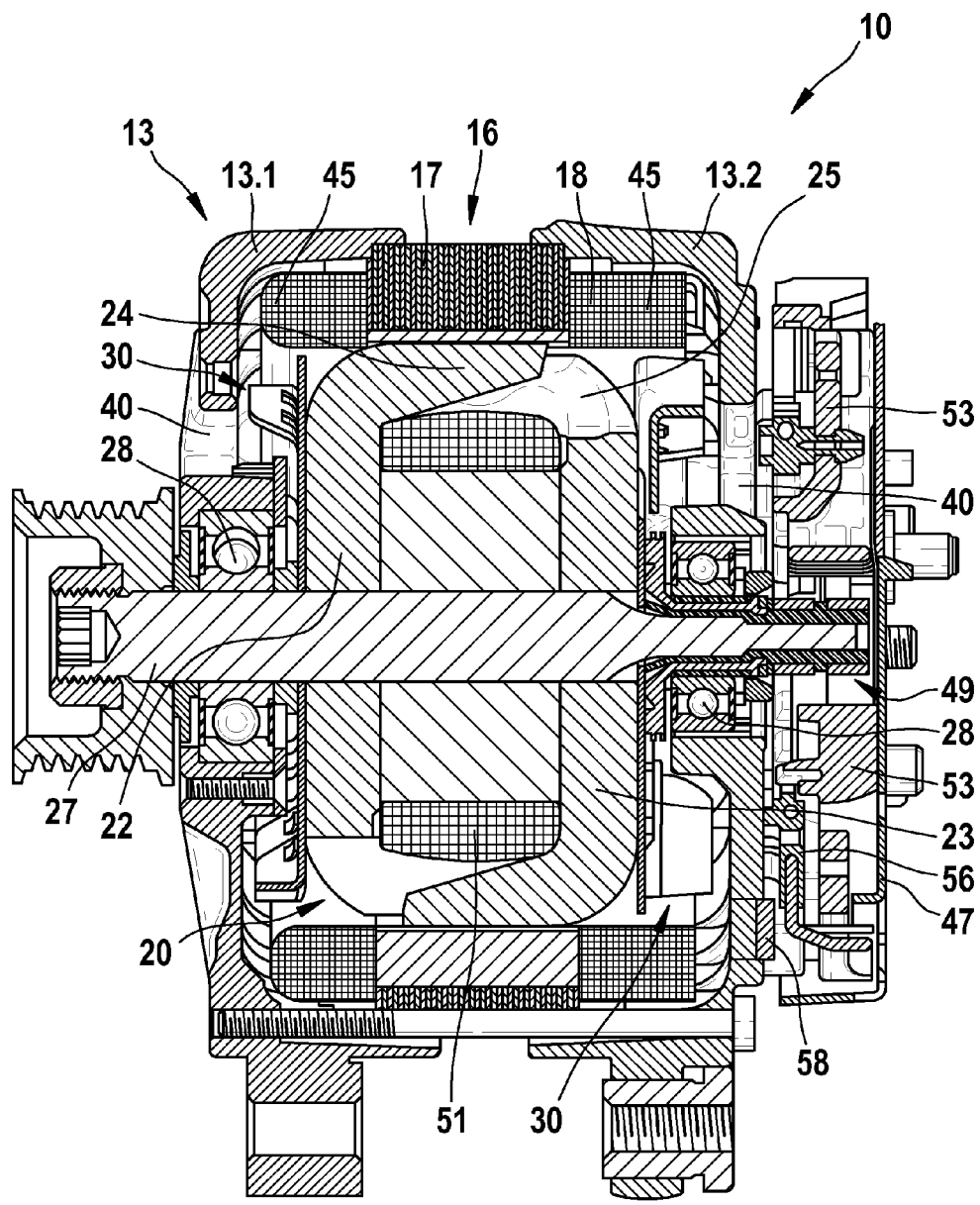
FIG. 1 shows a longitudinal section through an electrical machine.

FIG. 1 shows a longitudinal section through an electrical machine 10, in this case in the form of a generator or alternator for motor vehicles. Inter alia, this electrical machine 10 has a two-part housing 13, which consists of a first end frame 13.1 and a second end frame 13.2. The end frame 13.1 and end frame 13.2 hold a so-called stator 16 between them, which on the one hand consists of a substantially annular stator core 17 and in whose radially inwardly directed, axially extending slots a stator winding 18 is inserted. The radially inwardly directed slotted surface of this annular stator 16 surrounds a rotor 20, which is in the form of a claw-pole rotor. The rotor 20 consists, inter alia, of two claw-pole plates 22 and 23, on whose external circumference claw-pole fingers 24 and 25, which extend in the axial direction, are in each case arranged. The two claw-pole plates 22 and 23 are arranged in the rotor 20 such that their claw-pole fingers 24 and 25, which extend in the axial direction, alternate with one another on the circumference of the rotor 20. This results in magnetically required intermediate spaces between the claw-pole fingers 24 and 25, which are magnetized in opposite senses, and these intermediate spaces are referred to as claw-pole intermediate spaces. The rotor 20 is borne such that it can rotate in the respective end frames 13.1 and 13.2 by means of a shaft 27 and in each case one roller bearing 28, which is located on in each case one side of the rotor.

The rotor 20 has a total of two axial end surfaces, to each of which a fan 30 is attached. This fan 30 consists essentially of a section which is in the form of a plate or disk, and from which fan blades originate in a known manner. These fans 30 are used to allow air to be exchanged between the outside of the electrical machine 10 and the internal area of the electrical machine 10 via openings 40 in the end frames 13.1 and 13.2. For this purpose, the openings 40 are provided essentially at the axial ends of the end frames 13.1 and 13.2, via which cooling air is sucked into the internal area of the electrical machine 10 by means of the fans 30. This cooling air is accelerated radially outward by the rotation of the fans 30, such that it can pass through the winding overhang 45, through which cooling air can pass. The winding overhang 45 is cooled by this effect. After passing through the winding overhang 45, or flowing around this winding overhang 45, the cooling air follows a path radially outward, through openings which are not illustrated in this FIG. 1 here.

In FIG. 1, a protective cap 47 is located on the right-hand side and protects the various components against environmental influences. This protective cap 47 therefore, for example, covers a so-called slipring assembly 49, which is used to supply an exciter current to an exciter winding 51. A heat sink 53 is arranged around this slipring assembly 49, and in this case acts as a positive heat sink. The end frame 13.2 acts as a so-called negative heat sink. A connecting plate 56 is arranged between the end frame 13.2 and the heat sink 53 and is used to connect negative diodes 58, which are arranged in the end frame 13.2 and positive diodes, which are not shown in this illustration here, to one another in the heat sink 53, thus representing a bridge circuit, which is known per se.

Description of the Winding Production

Figure 2:
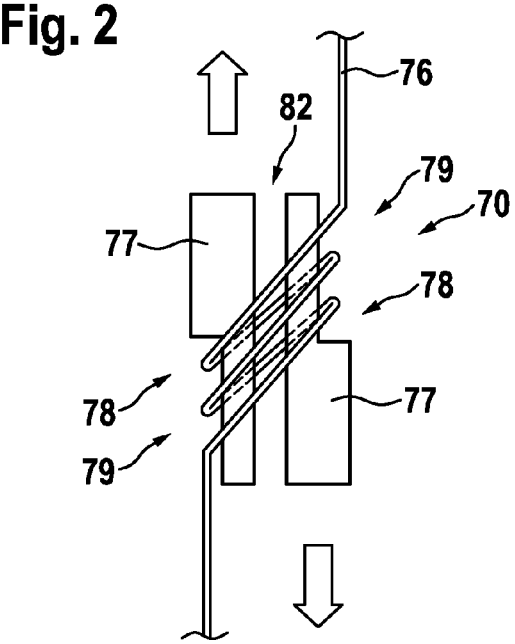
FIG. 2 shows the process of producing a coil.

FIG. 2 shows a side view of the process in which a wire 76 is wound onto an apparatus 70 for winding. The apparatus 70 for winding has two template elements 77, which can be moved with respect to one another in an axial direction. The two template elements 77 have a step 78, thus resulting in a flat area 79 on each template element 77. An oblique coil 82 is wound around these flat or low areas 79, bounded by the steps 78 in both axial directions. The coil 82 is moved down by pulling the template elements 77 out of the coil 82 from the apparatus 70, see also FIG. 3. Alternatively, the wire 76 can also be wound directly onto template elements 77 which are not offset with respect to one another, thus resulting in a coil 82 which is initially not oblique, over two flat or low areas 79 which are arranged directly opposite one another. The oblique coil 82 is created only when the two template elements 77 are offset with respect to one another against the resistance of the coil 82. In principle, the winding process can in this case be carried out in two ways: on the one hand, the wire 76 can be wound around the stationary template elements 77 and, on the other hand, the wire 76 can be wound around the template elements 77 which are rotated about a common axis. The latter process prevents the wire 76 from being twisted during the winding process.

Figure 3:
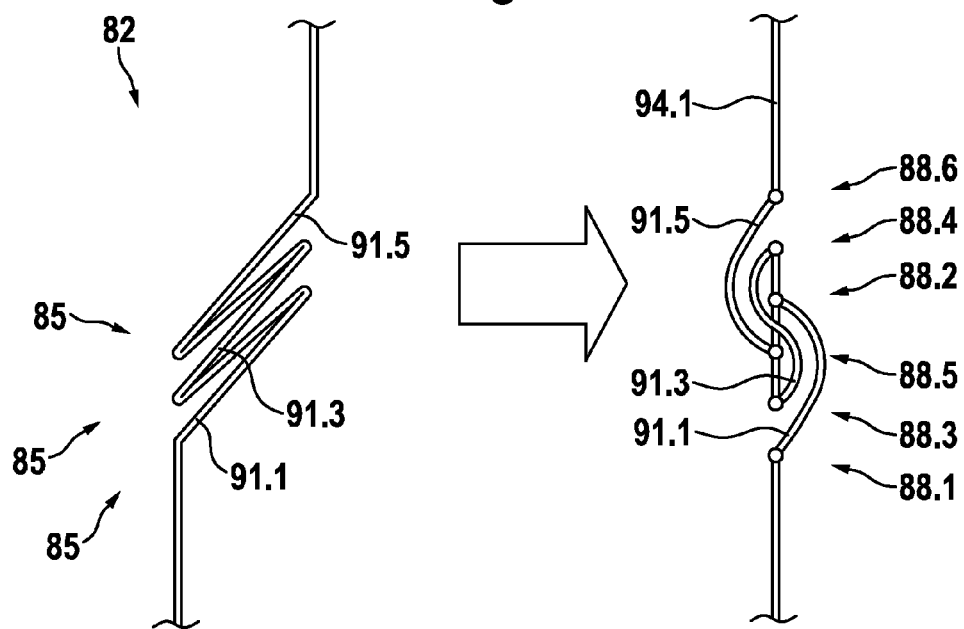
FIG. 3 shows a section in which the coil is flattened.

FIG. 3 illustrates how the coil 82 is shaped after it has been removed from the template elements 77. In the example, the coil 82 has three turns 85. Each turn 85 has two coil sides 88 which are annotated separately by a dot with a further number since this relates to a specific case of a coil side at a specific position. Therefore, a total of six coil sides are annotated as the coil sides 88.1, 88.2, 88.3, 88.4, 88.5 and 88.6 in the right-hand part of FIG. 3. This successive sequence is based on the sequence in which the coil sides are wound. The coil sides 88.1 and 88.2 are integrally connected to one another by a coil side connector 91.1, the coil sides 88.2 and 88.3 are integrally connected to one another by a coil side connector 91.2 which is not illustrated, the coil sides 88.3 and 88.4 are integrally connected to one another by a coil side connector 91.3, the coil sides 88.4 and 88.5 are integrally connected to one another by a coil side connector 91.4 which is not illustrated, and the coil sides 88.5 and 88.6 are integrally connected to one another by a coil side connector 91.5.

Figure 4A:
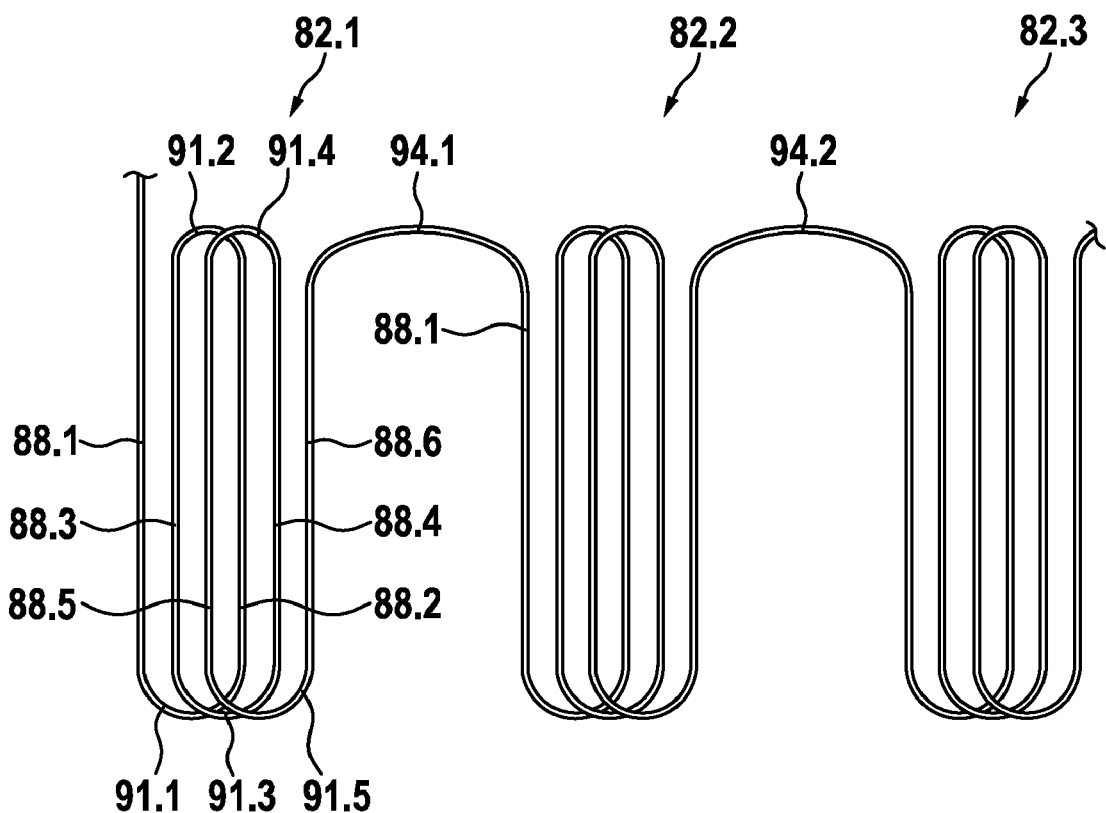
FIG. 4 shows a plane view of integrally linked and flattened coils.

The coil sides 88.1, 88.2, 88.3, 88.4, 88.5 and 88.6 can be seen in FIG. 4a, in the form of a plan view of the flat coil 82 (which is the same as the coil 82.1) from FIG. 3. The coil sides 88.1 and 88.2 are connected to one another by the coil side connector 91.1. The two coil sides 88.1 and 88.2 are therefore connected by the coil side connector 91.1. The coil sides 88.2 and 88.3 are connected by the coil side connector 91.2, the coil sides 88.3 and 88.4 are connected to one another by the coil side connector 92.3, the coil sides 88.4 and 88.5 are connected to one another by the coil side connector 91.4, and the coil sides 88.5 and 88.6 are connected to one another by the coil side connector 91.5. The coil side connector 91.5 is located above the coil side connectors 91.3 and 91.1, and the coil side connector 91.3 is located above the coil side connector 91.1. The coil side connector 91.4 is located above the coil side connector 91.2.

A first coil connector 94.1 is connected integrally to the coil side 88.6 and is in turn followed by a coil side 88.1 and so on—as already described for the first coil 82. Initially, the design of the coil 82.2 is the same as that of the coil 82.1 already described.

The state as is illustrated in FIG. 4a was reached by flattening the coil 82, as illustrated on the left in FIG. 3, see also on the right in FIG. 3. Looking at the illustration in FIG. 3 from left to right, it can thus be seen that the coil side connector 91.2 is located on the coil side connector 91.1 such that the coil side connector 91.1 is crossed over by the coil side connector 91.3, and the coil side connector 91.3 is located on the coil side connector 91.2 and crosses over the coil side connector 91.2 and also the coil side connector 91.1, see also FIGS. 4a and 4b.

In the example shown in FIG. 4a, each coil 82 is wound with an odd number of turns 85. Alternatively, it is also possible without any problem to wind an even number of turns 85 onto each coil 82. As will be shown later (FIGS. 14a and b), it may also be worthwhile to wind an even number of turns 85 onto coil 82, and to wind an odd number of turns 85 onto another coil 82. This is merely a question of the electrical configuration of the machine.

Figure 4B:
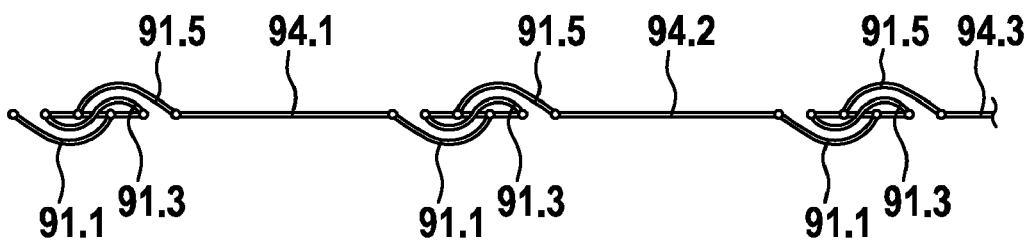

According to FIG. 3 and FIG. 4b, a method is provided according to which coils 82 of a phase winding are shaped after the winding of turns 85 such that the coil sides 88 of one coil 82 are arranged at least virtually on a plane. In this case, the turns 85 of a coil 82 are located at least partially one on top of the other.

Figure 5A:
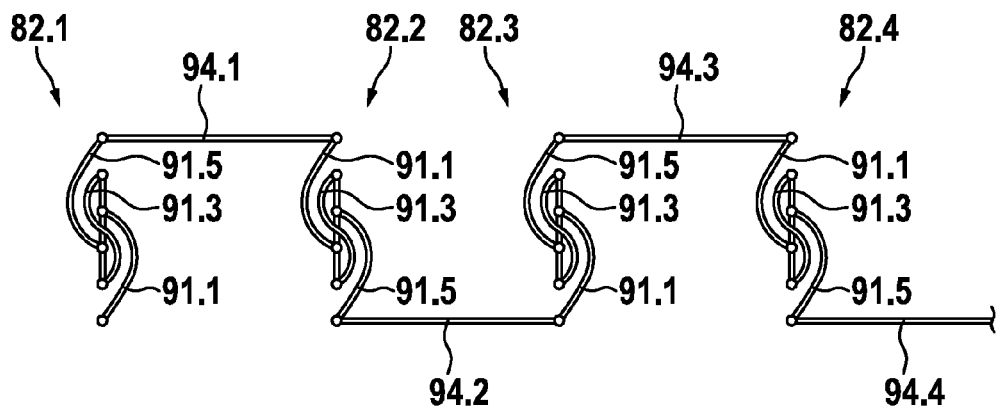
FIG. 5a shows the phase winding, in the initial stage, after the mutual positioning of the flattened coils.

FIG. 5a illustrates how the previously flattened coils 82 which are integrally connected to one another are positioned. In comparison to the state as is illustrated in FIG. 4b, the coil 82.1 is rotated through 90° with respect to the coil connector 94.1. The coil 82.2 is likewise rotated through 90° with respect to the coil connector 94.1. The two rotations of the coils 82.1 and 82.2 are carried out in mutually opposite directions, as a result of which the two coils 82.1 and 82.2 are rotated through 180° with respect to one another overall. Relative to the coil side connector 94.2, the coil side connector 94.1 is raised up. The coil 82.3 is likewise rotated through 90° with respect to the coil connector 94.2, and this likewise applies in precisely the same way to the coil 82.2 with respect to the coil connector 94.2. The coils 82.2 and 82.3 are rotated in opposite directions, as a result of which the resultant rotations of the two coils 82.2 and 82.3 through 180° with respect to one another also result in this case. The result of the positioning and rotation of the individual coils 82.1, 82.2, 82.3, . . . can be seen schematically in FIG. 5a. For the situation in which, for example, an arrangement which has 16 poles overall (16-pole embodiment of a phase winding) is provided, a total of 16 coils 82 are positioned with respect to one another, that is to say the coils 82.1 to 82.16. This positioning and rotation process is carried out for each initial stage and each phase winding which must later be inserted into a stator core. If the intention is to produce a stator core with three phases, then three phase windings are dealt with in a corresponding manner, and are introduced or inserted into the slots in the stator core. In the case of five, six or even seven phases, this is carried out analogously for five, six or even seven phases.

A method step is accordingly provided according to which two directly adjacent coils 82.1, 82.2 of a phase winding have a coil connector 94.1 between them, which coil connector 94.1 is connected integrally to the two directly adjacent coils 82.1, 82.2, wherein one coil 82.1 and the other coil 82.2 are each rotated through an amount of essentially 90 angular degrees with respect to the coil connector 94.1, with the rotation directions being mutually opposite.

Figure 5B:
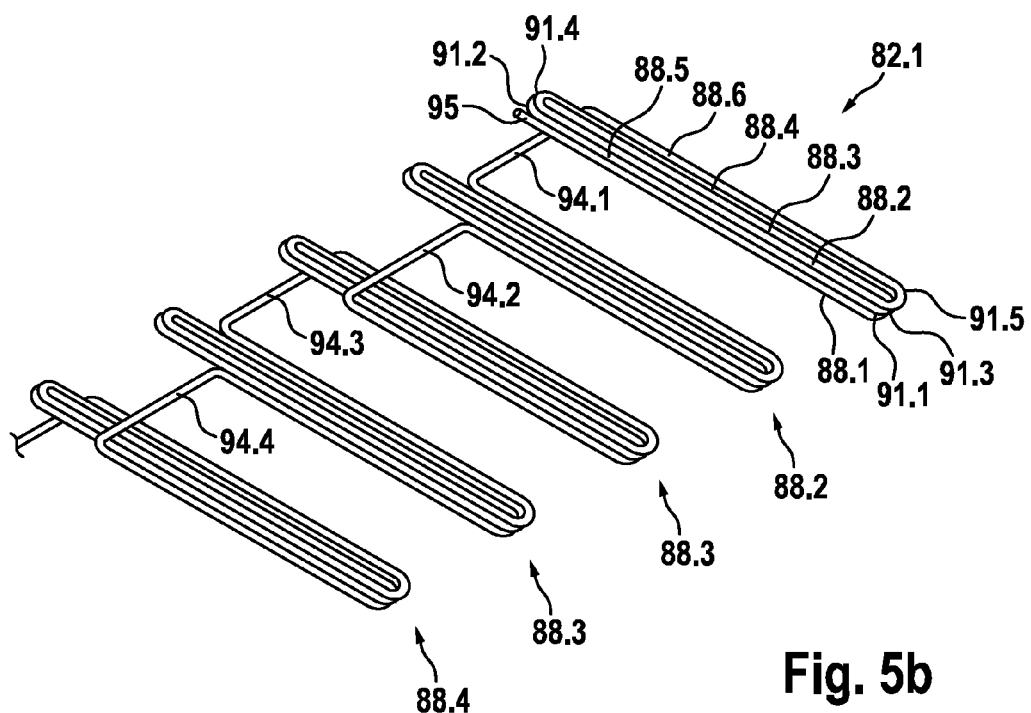
FIG. 5b shows a three-dimensional view of the initial stage of the phase winding.

FIG. 5b shows a three-dimensional view of the initial stage of the phase winding from FIG. 5a. This illustration shows the position of the individual coil sides 88.1 to 88.6. Furthermore, the coil side connectors 91.1 to 91.5 are illustrated, as well as a start 95 of the coil 82.1. The following coils 88.2 to 88.4 are likewise illustrated analogously to FIG. 5a.

FIG. 6a shows a side view of a shaping tool 100. The shaping tool 100 is formed essentially from two parts and has a lower part 101 and an upper part 102.

Both the lower part 101 and the upper part 102 have a substantially cuboid external contour. Slots are in each case introduced on one side of the lower part 101 and on one side of the upper part 102. These slots in the upper part 102 and the slots in the lower part 101 are opposite one another, in such a way that two mutually opposite slots form a common area. The slots are introduced both in the upper part and also in the lower part such that they extend in a straight line between two end faces. The number of slots in the upper part 102 preferably corresponds to the number of slots in the lower part 101, and preferably to the number of slots in the stator 16. In this case, the lower part 101 has an end face 108, and the upper part has an end face 109. The slots 105 are introduced in the lower part 101, and the slots 106 are introduced in the upper part. Compared with the initial stage of the phase winding illustrated in FIG. 5a, this is inserted into the slots 105 in the lower part 101, in the manner in which its coils 82.1 etc. are positioned. The individual coils 82.1, 82.2, 82.3 etc are in this case spaced apart such that, in the case of a stator winding with five phase windings, four slots are arranged between the coils which are directly integrally adjacent alongside one another. If this is a stator winding which has three phase windings, then two slots are arranged between the individual coils 82, analogously to this. If this is a five-phase stator winding, then, in the same way as in the figure, four slots 105 and 106 are arranged between the individual coils 82.

In consequence, a method is described for producing a stator winding in an electrical machine 10, in particular an alternator, with the stator winding 18 having at least n phase windings and a phase winding having a plurality of directly successive wound coils 82 with coil sides 88 and coil side connectors 91, with the coils 82 being subdivided into first and second coils. Furthermore, a shaping tool 100 is provided, in which there are slots 105 and 106 which are suitable for holding the coils 82. A first coil is a coil at a specific position in the initial stage of the phase winding or the phase winding itself, while a second coil is another coil 82, which follows the first coil as the next coil 82. Provision is accordingly made for a first coil to be arranged in one slot and for a second coil to be arranged in another slot. Correctly, n−1 slots are arranged between the first coil and the second coil 82.

Figure 6B:
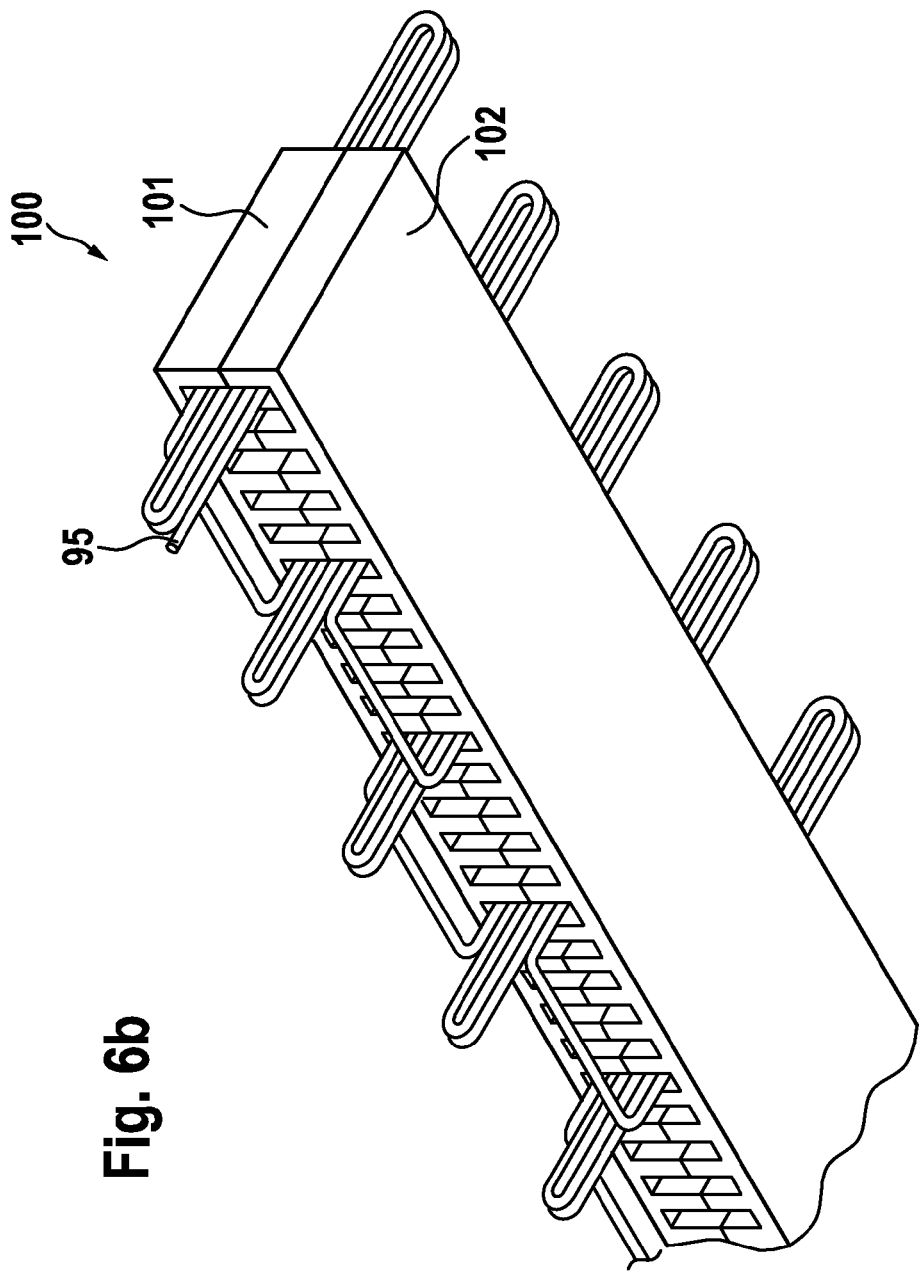
FIG. 6b shows a three-dimensional illustration, showing how the winding illustrated in FIG. 5a and FIG. 5b is inserted in the shaping tool 100, and/or the lower part 101 and its upper part 102.

FIG. 6b illustrates, three-dimensionally, how the winding illustrated in FIG. 5b and FIG. 5a is inserted in the shaping tool 100, or the lower part 101 and its upper part 102.

Figure 7:
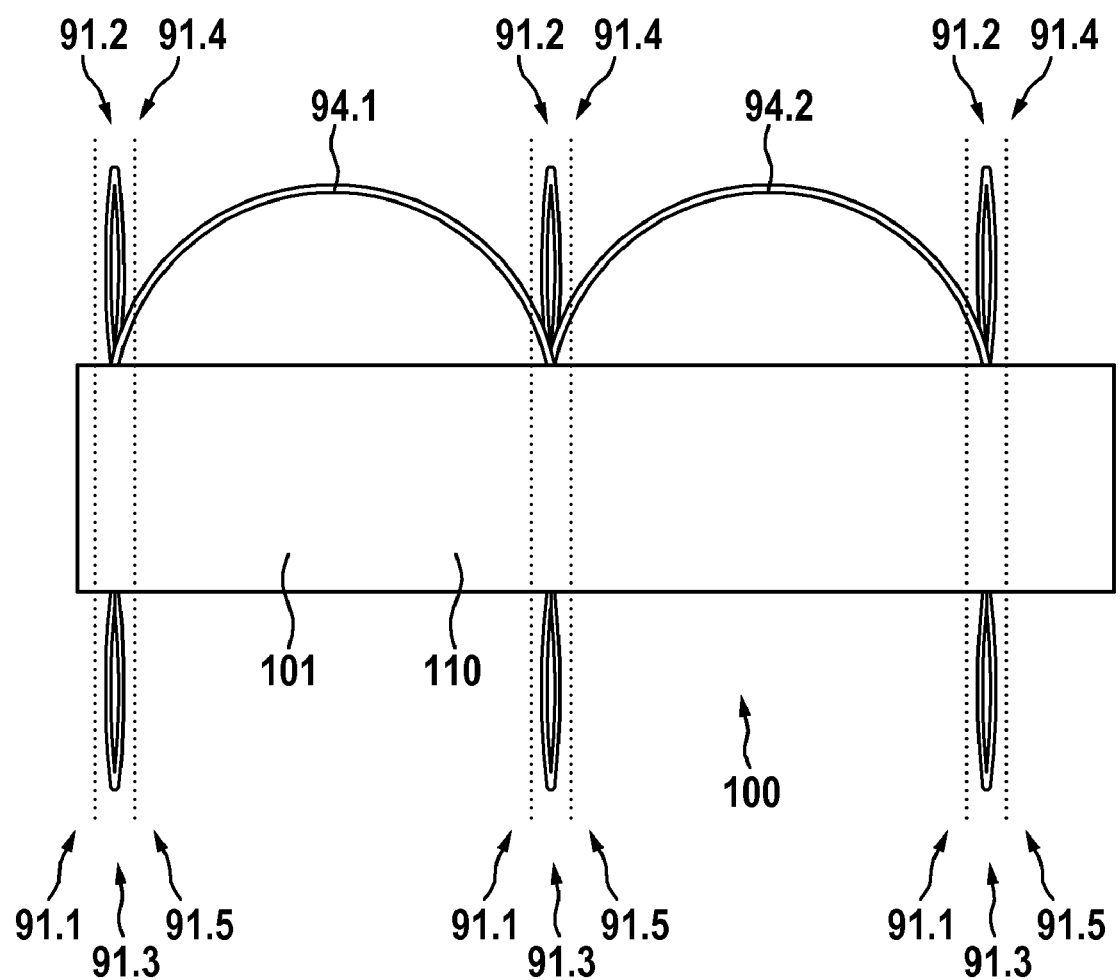
FIG. 7 shows a plan view of the shaping tool 100 and, very particularly, of a lower face 110 of the lower part 101.

In the side view shown in FIG. 7, the coil side connectors 91.2 and 91.4 can be seen, see also FIG. 4a. Furthermore, the coil connectors 94.1 and 94.2 are illustrated, likewise in a schematic view. At the lower end of the shaping tool 100, the coil side connectors 91.1, 91.3 and 91.5 project out of the slots 105 and 106. In the illustration in FIG. 7, only one initial stage of a phase winding is illustrated, as is also already the case in FIG. 6.

FIG. 8a shows a schematic illustration, in which a total of five phase windings and their initial stages are inserted in the shaping tool 100, to be precise the two tool parts the lower part 101 and the upper part 102. The coil connectors illustrated here are all arranged behind the lower parts 101 and upper parts 102, as seen by the viewer in FIG. 8a. This likewise applies to the coil connectors 94.2 for the individual phase windings.

Figure 8B:
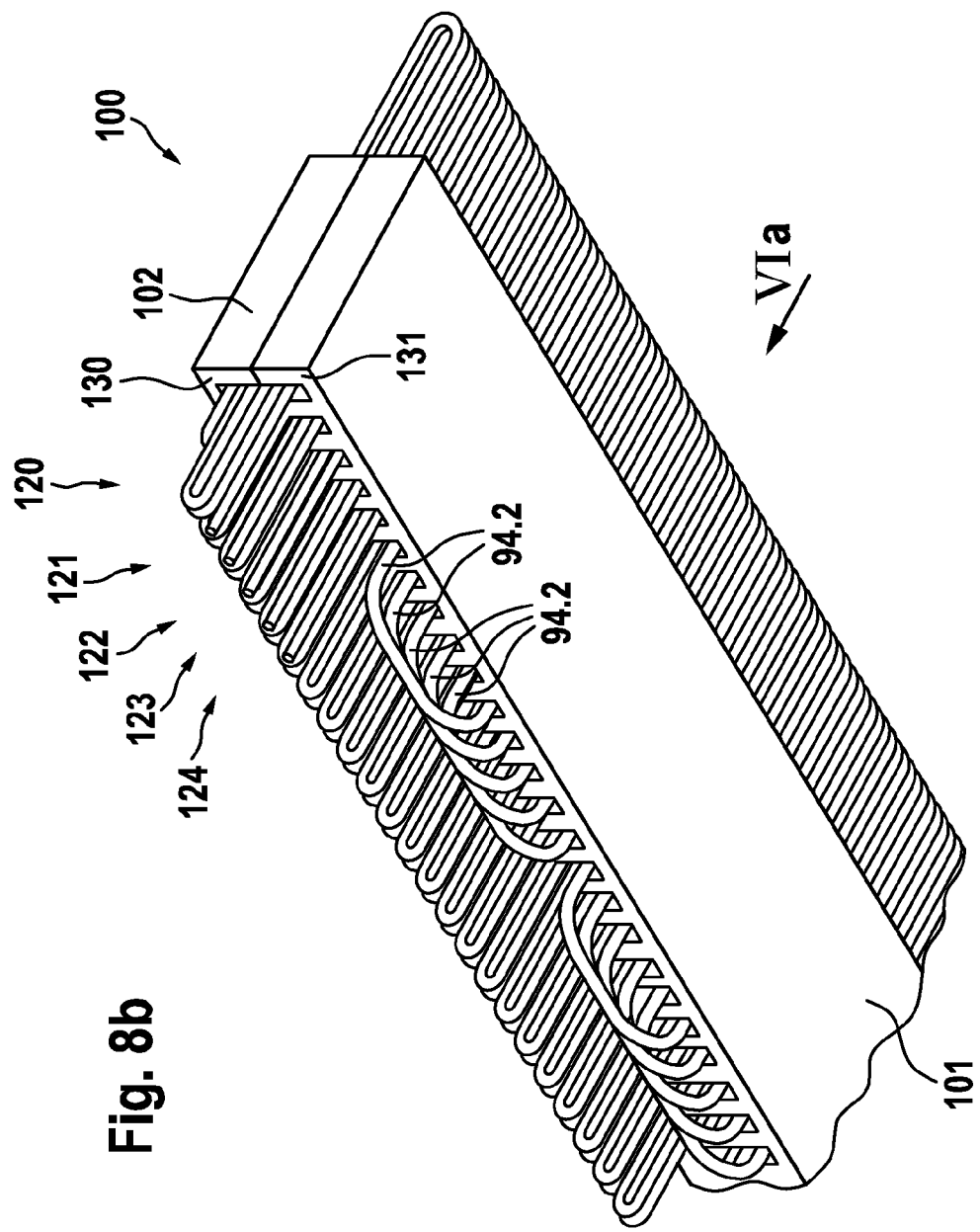
FIG. 8b shows a three-dimensional view of the phase windings inserted into the shaping tool.

FIG. 8b shows a three-dimensional view of the arrangement shown in FIG. 8a. The five initial stages of the phase windings are inserted in the shaping tool 100. This arrangement in the shaping tool 100 comprises a total of five phase windings, which are intended for a stator core which has eighty radially inwardly open slots. According to the configuration shown here, six conductors, which are stacked one on top of the other, are provided in each slot in the stator core which will finally be produced later. The five phase windings 120, 121, 122, 123 and 124 have in this case been plugged into the parts of the shaping tool 100 which have previously been fitted to one another, the lower part 101 and the upper part 102, from their axial end surface 130 and 131, into the slots 105 and 106, respectively.

FIG. 8c illustrates an alternative to the insertion method shown in FIG. 8b. According to FIG. 8c, an upper part 102 is provided, in whose slots 106 the individual phase windings, or their initial stages, are inserted for this purpose. While, in the case of the exemplary embodiment shown in FIG. 8b, no sequence need be defined for which phase winding is inserted into the slots 105 and 106 first of all, and all that need be considered is how the individual coil connectors 91.2 should be arranged with respect to one another, according to the exemplary embodiment shown in FIG. 8c, a precise sequence must be complied with respect to the position of the individual coil connectors 94.2 and the further coil connectors 94.3, 94.4 etc. In order to make it possible to achieve the structure as illustrated in FIG. 8b of the position of the individual coil connectors 94 in the shaping tool 100, it is necessary according to the embodiment variant shown in FIG. 8c for the individual phase windings to be inserted into the upper part 102 of the shaping tool in a specific sequence. Thus, it is necessary first of all to start with the phase winding 124, before then inserting the phase winding 123, which is followed by the phase winding 122 and then in turn by the phase winding 121 in order then, finally, to insert the phase winding 120. This sequence results in the arrangement of the coil connectors 94.2 as shown in FIG. 8b. Once the five phase windings 120 to 124 in the example have been inserted into the upper part 102, the lower part 101 is placed on the winding or the upper part 102. This step is not illustrated here, but, after this step, the situation is the same as that illustrated in FIG. 8b.

The intention is for all the phase windings 120 to 124 to be held at the same time in the shaping tool 100 in order to be shaped at the same time. In this case, provision is made for the axial length of the coil connectors 94 not to be reduced, while the axial length or extent of the coil side connectors 91 is reduced during the shaping process.

Alternatively, the phase windings 120 to 124 may also be inserted into the lower part 101. The sequence of the phase windings to be inserted must then be adapted, if the aim is to achieve the same result as in FIG. 8b. Accordingly, the phase winding 120 is then inserted first, followed by the phase winding 121, then the phase winding 122, then the phase winding 123, and then the phase winding 124.

As has already been described with reference to FIG. 8b or FIG. 8c, the intention is to insert the phase windings 120 to 124 into the shaping tool 100 either in the direction of the coil sides (FIG. 8b) or transversely with respect thereto. Insertion of the coil sides 88 transversely with respect to the shaping tool 100 means that the movement direction during insertion into the shaping tool has at least one component which is directed at right angles to the coil sides 88 and the wire direction.

FIG. 9 illustrates the next step, which follows the arrangement shown in FIG. 8b. For the sake of clarity, only the phase winding 120 is illustrated here. The other phase windings 121 to 124, which are not illustrated here, are subject to precisely the same process, with the corresponding phase windings only being inserted in each case offset by one slot 105 in the lower part 101 and one slot 106 in the upper part 102. As explained above, each coil 82 has coil sides 88. These coil sides 88.1, 88.3 and 88.5 form a group 130. This group 130 has the feature, according to which this is inserted in the lower part 101, and into a slot 105 there, without projecting into the slot 106 in the upper part 102.

Furthermore, another group 133 can be seen, which comprises the coil sides 88.2, 88.4 and 88.6. The coil sides 88.2, 88.4 and 88.6 in this group 133 have the common feature that these coil sides 88 are inserted in a slot 106 in the upper part 102, and do not extend to such an extent that they project into a slot 105.

These features of the groups 130 and 133 have the purpose of in this way defining a separating plane 136, in which no coil sides 88 are located and, in consequence, this separating plane 136 cannot be blocked by the coil sides 88, in particular by the coil sides 88.5 and 88.2. This is important because the upper part 102 should be moved with respect to the lower part 101. According to the further method step which is now provided, there is provision that the upper part 102 is moved relative to the lower part 101 corresponding to the arrow 139 in order in this way to move the coil sides of the group 133 with respect to the coil sides 88 of the group 130 to such an extent that the coil sides 88 in the group 133 come to rest with respect to a further group 130 in a slot 105 associated with another coil, specifically the coil 82.2. In this case, the group 133 is moved to such an extent that n−1 slots 105 are arranged in the movement direction of the coil sides 88 after the movement between the two groups 130 and 133 of a coil 82. Since n is five in this exemplary embodiment, there is a separation of four slots 105 between the group 130 of the coil 88.1 and the group 133 of the coil 82.1. A method is accordingly provided according to which one or more phase windings 121, 122, 123, 124, 125 are inserted into slots 105, 106; 105', 106' in a shaping tool 100, and each coil 82 has coil sides 88, with a group 133 of the coil sides 88 being moved with respect to another group 130 of the coil sides 88 of the same coil 82, and being shaped, such that n−1 grooves are arranged at 105 between the two groups 130, 133 in the movement direction of the coil sides 88. If the exemplary embodiment were to comprise a three-phase design, then the number of slots 105 between the two groups 130 and 133 would be two slots 105. In the case of a six-phase design, the separation would be n−1=5, and in the case of a seven-phase design, the separation would be n−1=6 slots 105.

It is intended that all the phase windings 120 to 124 will be held at the same time in the shaping tool 100, in order to be shaped at the same time. However, in principle, it is also possible to shape the phase windings 120 to 124 individually, each on their own, in order to fit the phase windings 120 to 124 to one another only after this has been done.

The windings are removed from the tool by removing the upper part 102 from the lower part 101 in the subsequent radial direction (stacking direction of the coil sides 88), and by only then removing the winding from the tool. The upper part 102 and the lower part 101 must therefore be movable with respect to one another on two planes or in two axial directions (later circumferential direction and later radial direction).

FIG. 10 shows, highly schematically, a view of coil sides 88. In contrast to the exemplary embodiment described above, this slot section 140 does not have six coil sides 88.1 to 88.6, but five coil sides 88.1 to 88.5. This is because, during production for example as shown in FIG. 8a or 9, first and second coils 82 have different numbers of turns. For example, a first coil has three turns, while a second coil has two turns. A constellation such as this results in five coil sides after movement as shown in FIG. 9, which are arranged one on top of the other and can thus be inserted into one slot in a stator core. On the left-hand side of FIG. 10, r denotes the direction which indicates the increase in the radius starting from a subsequent center point of a round stator core. In other words: the lower coil side connector 91.1 is located radially furthest outward, while the coil side connector 91.5 is arranged radially furthest inward. The coil side connectors 91.1 and 91.3 which are located radially furthest outward in FIG. 10 are originally coil side connectors of a second coil with only two turns, while the coil side connectors 91.1 to 91.5 which are located radially further inward are the coil side connectors of a first coil with three turns. This phenomenon will also be described at another point later in the description.

FIG. 10 shows a final state of a slot section 140 and of junction areas 149 which are in each case arranged on both sides of the slot section 140. Outside the junction areas 149, there are in each case adjacent end winding areas 152. According to the envisaged method step, there is a round wire cross section, as sketched at a, before stamping, over the entire length of the section 146, of the junction area 149 and also of the end winding area 152 for the individual wire sections, which are not referred to here in any more detail. The intention with shaping or stamping is to carry out shaping from the cross-sectional area sketched with a or under a or the section 146 such that the wires no longer have a round cross section, but such that the external contour of the totality of all the coil sides 88 has a trapezoidal external contour (envelope), c). This trapezoidal contour is intended to be stamped in the same mold over the entire section 146 which will be inserted in a slot in a stator core, see also b) and d). A junction area 149 which has a length of a few millimeters in each case starts at the final positions of the section 146. At the end of the junction area 149 which is remote from the section 146, the junction area 149 merges into the already mentioned cross section, as has been described with reference to a). The cross-sectional area—as is sketched here for e), is the same as that of a). According to the invention, the junction area is stamped in a defined manner and represents a contour which merges continuously from the trapezoidal cross section to the round cross section of the individual wires in the axial direction (rotation axis of the rotor) with respect to the electrical machine.

It is accordingly envisaged that the coils 82 are provided with a stamped junction area 149 between coil sides 88 and coil side connectors 91.

Figure 11A:
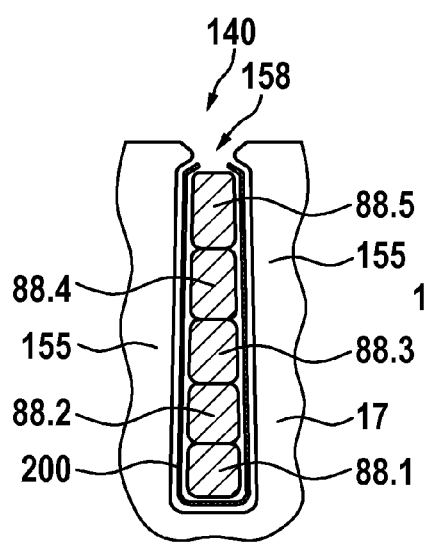
FIG. 11a and FIG. 11b show two different slot cross sections.
Figure 11B:
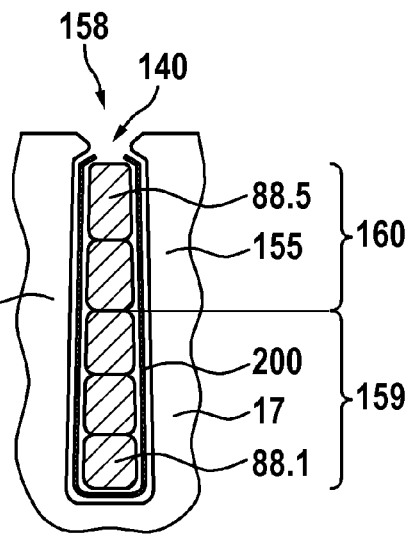

FIG. 11a and FIG. 11b show, in the form of a detail, side views of the cross section of two slot sections 140 of two different exemplary embodiments. This slot section 140 is inserted in a slot 158 between two teeth 155. While the left-hand slot in FIG. 11a has core sides 88.1 to 88.5 with a trapezoidal cross section overall, the slot 158 in FIG. 11b has a somewhat more complex slot cross section. For example, the slot cross section in the area of the slot section 159 is rectangular, while it is once again trapezoidal in the slot section 160. In this case, the position of the coil sides 88.1 to 88.5 is as follows: the coil side 88.1 is radially furthest outward with respect to the stator core 17, while the coil side 88.5 is radially furthest inward. As can be seen simply by comparison with FIG. 10, cross section b) with the cross section from FIG. 10a), stamping of the slot section 140 results in the wires or wire cross sections, which originally had a round cross section, being shaped such that, for example, the radially inner coil side 88.5 is crushed to a relatively major extent in the circumferential direction.

Figure 11C:
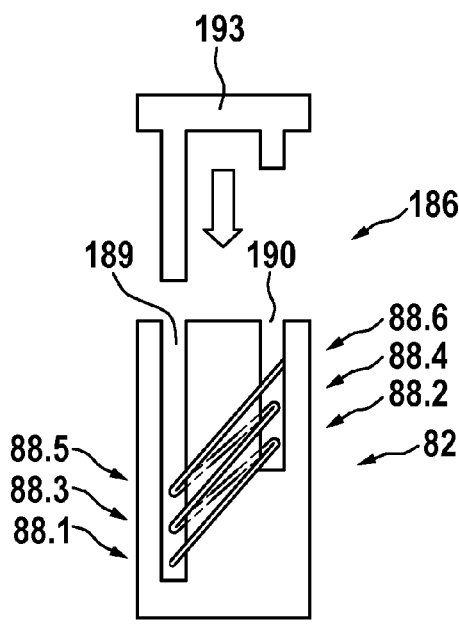
FIGS. 11c and 11d show two different methods for stamping the coil sides which are intended to be located in one slot.
Figure 11D:
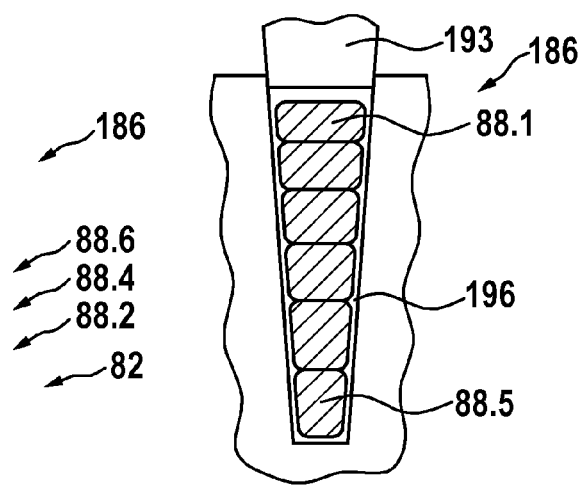

As shown in FIG. 11a) and FIG. 11b), the intention is for the coil sides 88.1 to 88.5, and therefore different coil sides, to be stamped differently. As is shown in FIG. 11c and FIG. 11d, the intention is for the coil sides 88 to be stamped in a stamping tool 186. While, according to the schematic FIG. 11c, this is possible, for example, in an early stage of the winding process, for example shortly after winding the coil 82, with the coil sides 88.1, 88.3 and 88.5 first of all being inserted into a stamped slot 189, which is separated from a stamped slot 190 for the coil sides 88.2, 88.4 and 88.6. The coil 82 is then also stamped by means of a stamping diode 193 before the movement of the coil sides, as shown in FIG. 9. Alternatively, according to FIG. 11d, it is also possible to stamp the coil sides 88.1 to 88.5 in a stamped slot 196 jointly and once by means of a stamping diode 193 in a subsequent method step, for example after constriction.

The stamping according to FIG. 11d) can also be carried out such that all the phase windings 120 to 124 with all their coil sides are shaped at the same time in one stamping tool 186 (for example after constriction).

In order to make the illustration clearer, FIGS. 12a) to e) illustrate the stator core 17 after insertion of the phase windings 120 to 124, as a result of which the individual phase windings 120 to 124 are each illustrated separately in the stator core 17. The individual phase windings 120 to 124 are in principle of the same design. The difference between the individual phase windings 120 to 124 is only because they are each inserted into the stator core 17 offset by one slot from the start. The phase winding 120 which is inserted into slot 1 at the start has a so-called winding overhang 163. Since this stator core is a stator core 17 which is produced using the so-called flat-pack technique, for example see also the initially cited document, a stator core 17 such as this is formed by stacking of individual essentially straight laminates 166. These laminates 166 are in general coincident at least in the slot area and are stacked in the direction of the slots 158, thus resulting in a substantially cuboid laminate pack or stator core 17. These laminates 166 are normally connected to one another during the course of this pack production process, for example by means of weld beads on a rear face 169 of a yoke 172 or in the inside of the slot, to form a solid pack. After all the phase windings 120 to 124 have been inserted into the stator core 17, this is bent round such that the openings or slot apertures 175 of the slots 158 face radially inward. The two end surfaces 177 and 176 are in this case placed on one another and are then connected to one another in an interlocking manner by means of a connection technique such as welding. The stator core is then complete with the stator winding 18, and can be installed in the electrical machine 10, to be precise between the two end frames 13.1 and 13.2.

The phase winding 120 is in this case positioned in the stator core 17 as follows: in this case, as described above, the single phase winding is on the basis of FIG. 2 up to and including FIG. 9. In the state shown in FIG. 9, the phase winding has its phase connection 95 at right angles to the plane of the sheet, and the phase connection 95 is directed behind the lower part 101. The phase winding 120 illustrated in FIG. 9 has been rotated with respect to FIG. 12a, effectively about the arrow 136 in FIG. 9, such that, after rotation and as shown in FIG. 12a, the phase connection 95 is arranged at the top on the left, that is to say in slot 1 in the outermost slot position. A coil side 88.1 extends from this phase connection 95 in the first slot position in the slot direction behind the stator core 17, in order to merge there after the junction into the coil side connector 91.1 and, after entering the slot position 4 in slot 6, into the coil side 88.2. From there, the wire emerges from the slot 6 and merges there into the coil side connector 91.2, which enters the slot position 2, that is to say the penultimate outermost radial position in the slot 1, on the front face of the stator core 17. There, the wire merges into the coil side 88.3. From there, the wire then passes into the coil side connector 91.3, and then into the coil side 88.4 (slot position 5, penultimate innermost position), in order once again to merge from there into the coil side connector 91.4, which merges into the third position and the coil side 88.5. The wire leaves the slot 158 on the rear side of the slot 1 in the slot position 3, once again merges into a coil side connector, specifically the coil side connector 91.5, which again emerges there after passing through the slot 6 at the radially innermost position and the existence as a coil side 88.6, and merges into the radially outermost position at the radially innermost position as the coil connector 94.1. The individual further stations of the wire are in this case outlined briefly as follows:

Entry into slot 11, radially innermost position (slot position 6), coil side 88.1, then Coil side connector 91.1, Slot 6, slot position 3, coil side 88.2;

Coil side connector 91.2;

Coil side 88.3 (penultimate innermost radial slot position), slot position 5,

Coil side connector 91.3,

Entry into the penultimate outermost slot position in slot 6, coil side 88.4,

Coil side connector 91.4,

Coil side 88.5, slot 11, slot position 4,

Coil side 91.5,

Coil side 88.6, slot 6, radially outermost slot position,

Slot position 1, junction into the coil connector 94.2 which merges over the radially outermost position, that is to say from slot 6, slot position 1, into slot 11, slot position 1.

The phase winding 120 then physically ends in the already mentioned winding overhang 163, which is theoretically located at a slot position 81, but can later be inserted into the slot 1 shortly before completion of the process of bending the stator core 17 round. This winding overhang 163 consists of three coil sides 88.1, 88.3 and 88.5. However, the phase winding end does not end in the overhang, but still in the stator core, see also FIG. 12.

As already mentioned, the phase winding 121, FIG. 12b, is offset by one slot in a corresponding manner, and starts at slot 2, at the same position with respect to the slot position. This also applies to the phase winding 121, which starts in the slot 3, to the phase winding 123 which starts in the slot 4, and to the phase winding 124, which starts in the slot 5. The winding overhang 136 of the phase winding 121 is therefore theoretically located at the slot position 2, and is subsequently inserted into the slot 2, before completion of the process of bending round, onto the coil sides 88.1, 88.3 and 88.5 which are already located there. The phase winding 121 likewise has a winding overhang 163, which, however, is located at the slot position 3 and is accordingly inserted later into the slot 3 onto the coil sides 88.1, 88.3 and 88.5, before completion of the process of bending round. The winding overhang 163 of the phase winding 123 is located at the slot position 4, and is inserted into the slot 4 onto the coil sides 88.1, 88.3 and 88.5 before the process of bending round, to be precise before the completion of the process of bending round. In the same way, the winding overhang 163 of the phase winding 124 is located at the slot position 5 before completion of the process of bending round into the slot 5 onto the coil sides 88.1, 88.3 and 88.5.

According to the exemplary embodiment shown in FIG. 12, starting from the respective end 176 or 177, there are in each case n phase connections 95 in the first n slots 158, and n phase connections 180 in the last n slots 158.

The coils 82 are in each case, so to speak, formed by two layers. That is to say the coil sides 88 are arranged in (2) radially different layers.

Furthermore, the coil sides (88.1, 88.3, 88.5; 88.2, 88.4, 88.6) of each typical second coil 82.2 (82.4, 82.6, 82.8, 82.10, 82.12, 82.14, 82.16) are located in two slots 158, in which case two coil connectors 94.1 and 94.2 are connected to form two coil sides 88.1 and 88.6 of adjacent coils 82.1 and 82.3, that is to say they in each case connect the first and the last coil side of an adjacent coil, in which case these coil sides 88.6 and 88.1 are inserted in the same slots 158 as the coil sides 88.1, 88.3, 88.5; 88.2, 88.4, 88.6 of the coil 82.2 located between them.

Figure 13:
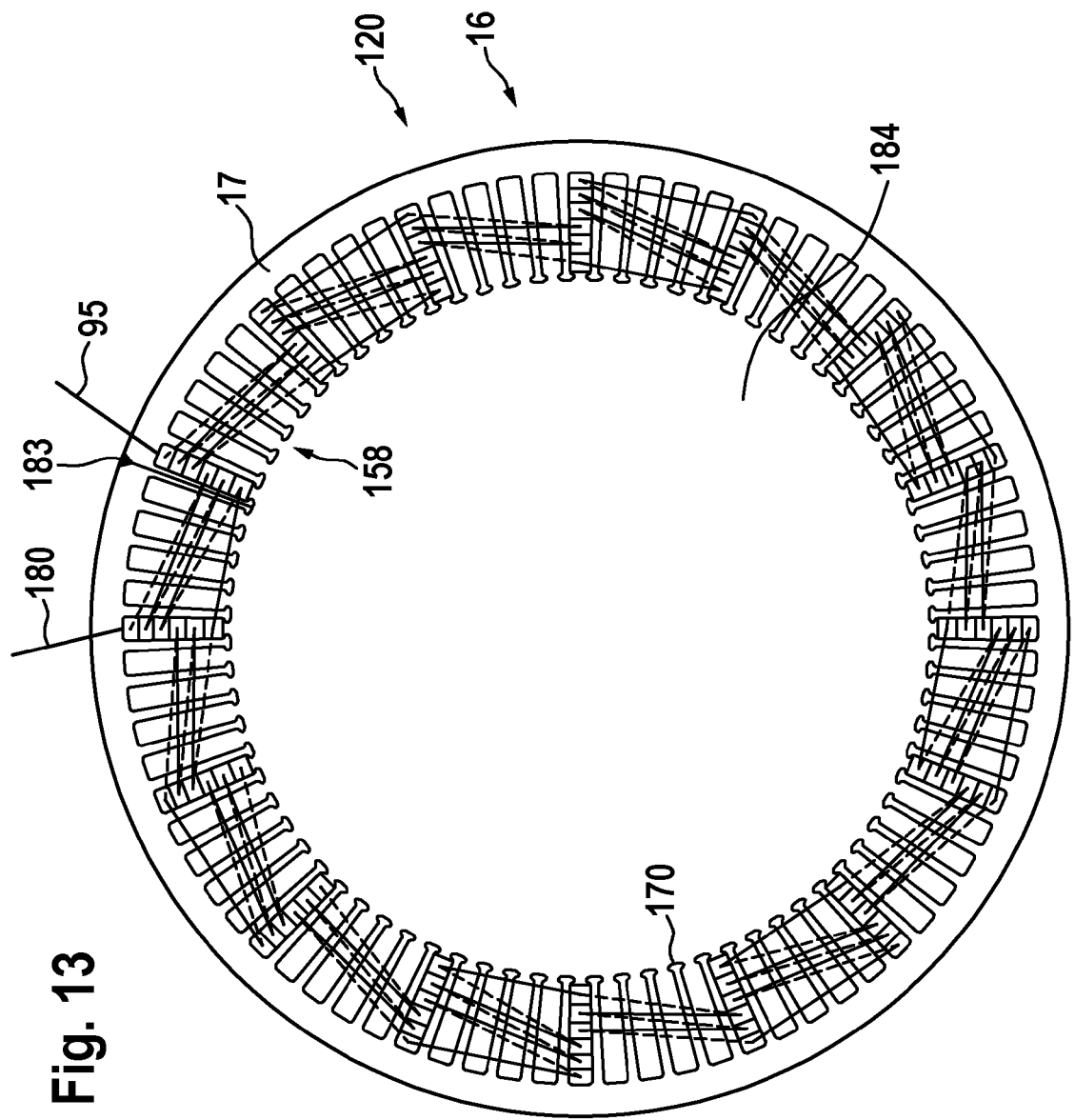
FIG. 13 shows the position of the phase winding from FIG. 12a in the stator core which has been bent to be round, FIGS. 14a and b show the process of restricting a phase winding for a stator having an odd number of coil sides per slot.

FIG. 13 shows the phase winding 120 in the stator core 17 after the stator core 17 has been bent round, with the respective phase windings 120 and 124. For the sake of simplicity and clarity, the phases 121 to 124 have not been illustrated here. As has already been indicated in FIGS. 12a to e, the position of the other phase windings 121 to 124 is simply offset by one slot with respect to the respectively preceding phase windings, starting with the phase winding 120. Furthermore, a phase connection 180 and a weld bead 183 can be seen, which weld bead 183 connects the two ends 177 and 176 to one another. The stator core 17 has a substantially central opening 184. FIG. 13 shows the connection-side view of the stator 16, which is normally that side which faces the rectifier in the electrical machine 10 which is in the form of an alternator.

Furthermore, the stator 16 can also be described by stating that in each case at least one group of single-layer coil connectors 94.1; 94.2 of a plurality of phase windings 120, 121, 122, 123, 124 is arranged on the internal circumference and on the external circumference of the stator core 17, with the coil connectors 94.1; 94.2 being arranged in immediately adjacent slots 158, and crossing one another. Coil side connectors 91 of a plurality of phase windings 120, 121, 122, 123, 124 are arranged between one group of single-layer coil connectors 94.2 on the external circumference of the stator core 17 and one group of single-layer coil connectors 94.1 on the internal circumference of the stator core 17.

FIGS. 14a and b show one exemplary embodiment of the production of a phase winding 120 which has five coil sides 88 in each slot. As has already been explained with reference with FIG. 3, a first coil 82.1 with three turns 85 and a second coil 82.2 with two turns 85 are wound for this purpose. This sequence is repeated the correspondingly required number of times, thus resulting, overall, in a winding with sixteen coils 82, by way of example.

Figure 14:
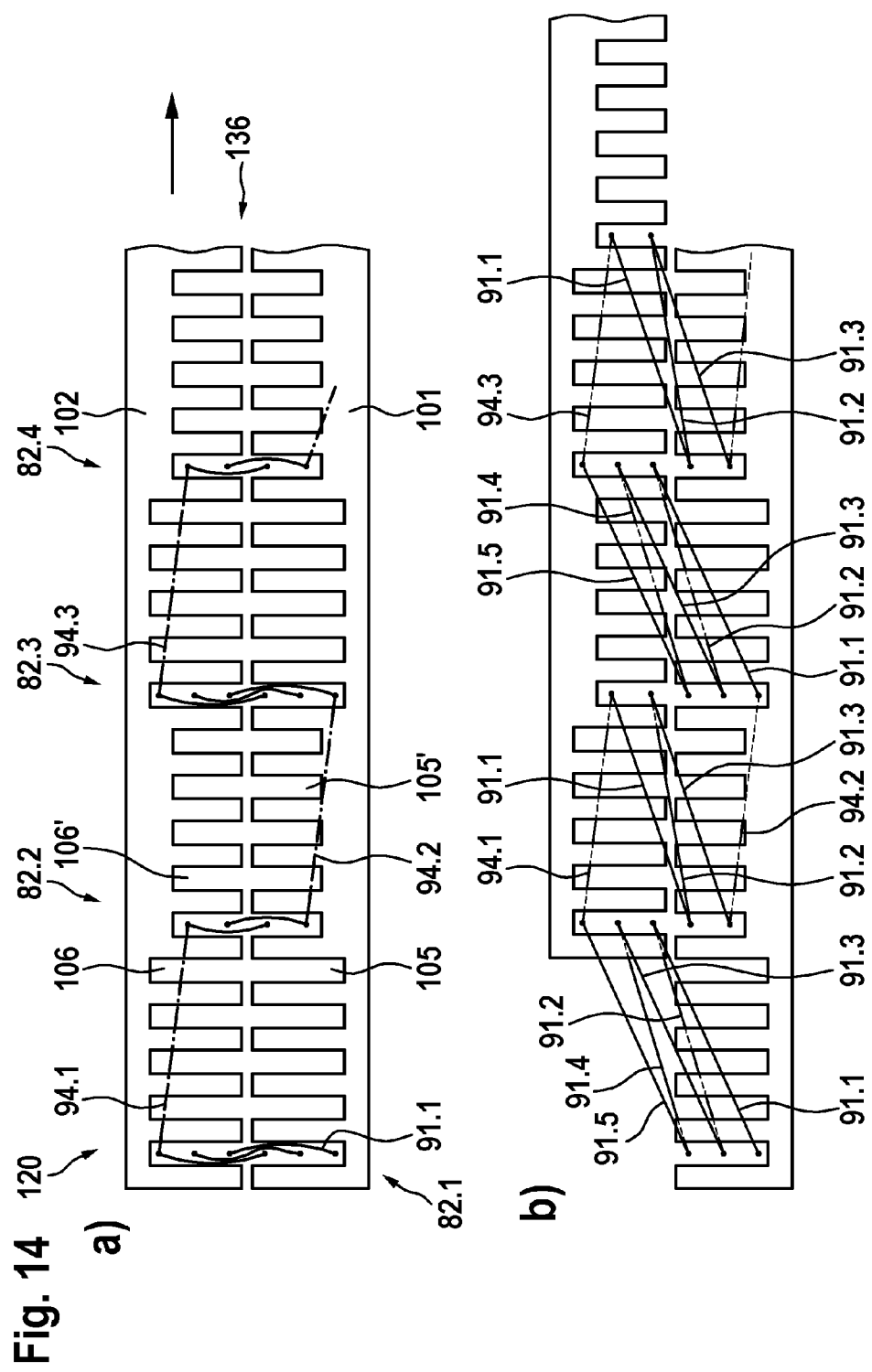
Figure 15:
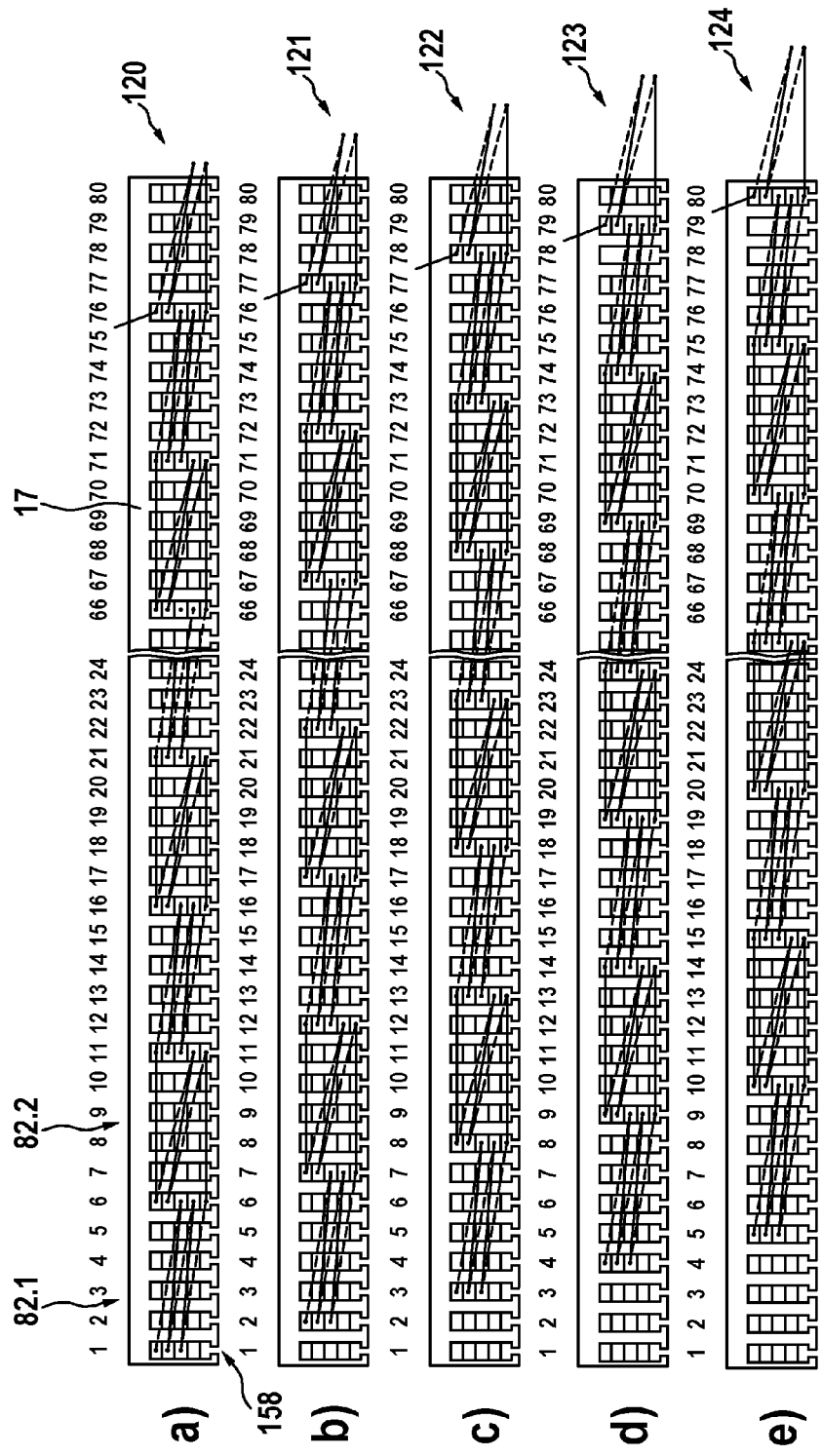
FIGS. 15a to e show the position of five phase windings in the stator core, with the individual phase windings having five conductors per slot.

Analogously to the processes which have been explained in conjunction with FIGS. 4a, 4b and 5a, the individual successive coils 82 are each rotated through 90°, thus resulting in the configuration illustrated in FIG. 14 for the individual phase winding.

In order that the position of the individual coils 82.2 and 82.4—an entirely general form of the coils which have fewer turns 85 than other coils 82—is such that the lower part 101 can be moved relative to the upper part 102, the slots in the upper part and lower part, which are intended to hold coils 82.2 and 82.4 with few turns 85, are equipped with a shallower slot depth than the other slots. When the number of phases is 5, this means that a further five slots 105' and 106' follow five slots 105 and 106 which hold coils 82.1, 82.3, . . . with more turns 85, with the five slots 105' and 106' holding the coils 82.2, 82.4, . . . with fewer turns 85. When the number of phases is 3, 6 or 7, 3, 6 or 7 of these slots 105, 105', 106, 106' in each case follow one another. Following the insertion of all the phase windings 120 to 124 (not illustrated), the upper part 102 is moved relative to the lower part 101. Since the phase windings 120 to 124 are not all arranged in one layer after the constriction process, with said layer comprising only the five intended slot positions in the stator core 17, the phase windings 120 to 124 which are arranged in a total of six slot positions in the shaping tool 100 have to be moved in their own right in order to reach the five intended slot positions.

Accordingly, with reference to FIGS. 6a and 14, there is provision that the shaping tool 100 has a lower part 101, which is provided with slots 105, 105', and an upper part 102, which is provided with slots 106, 106', with the slots 105, 106 either having the same slot depth (FIG. 6a) or different slot depths (FIG. 14).

A second exemplary embodiment of five phase windings is illustrated in a very similar manner in FIGS. 15a to 15e. In contrast to the illustration shown in FIGS. 12a to e, these five phase windings 120 to 124 have only five coil sides 88 in each slot 158. This therefore involves the coils having different numbers of turns. The first coil, like the phase windings shown in FIG. 12 as well, admittedly has three turns. However, in comparison to the first coil, the second coil now has only two turns. A coil 82.1 is correspondingly disclosed which has an odd number of turns, and a coil 82.2 is disclosed which has an even number of turns. In this case, in the exemplary embodiment shown in FIG. 14, the coil 82.1 is a first coil, and the other coil 82.2 is a second coil. The production method for the phase windings 120 to 124, as is shown in FIG. 15, is correspondingly slightly different from that shown in FIG. 6a: while, as before, the coil 82.1 has three turns, the coil 82.2 now has only two turns. A shaping tool, as is illustrated in principle in FIG. 6a, is therefore somewhat different for production of the phase windings 120 to 124 as shown in FIG. 15 because the slots 105 and 106, respectively, in the lower part 101 and in the upper part 102 would be somewhat shallower starting from the separating plane 136 at the position of the second coil 82.2, see also FIGS. 14a and b. For example, coming from the first coil 82.1, the coil connector 94.1 is correspondingly inclined somewhat with respect to the separating plane 136, in order then to project into the slot 106', directed somewhat closer to the separating plane 136. The coil connector 94.2 correspondingly projects out of the slot 105' at a position which is arranged somewhat closer to the separating plane 136. In the slot 105 where the coil 82.3 is located, the coil connector 94.2 then once again projects into the slot 105 once again at the position which is furthest away from the separating plane 136.

Figure 16:
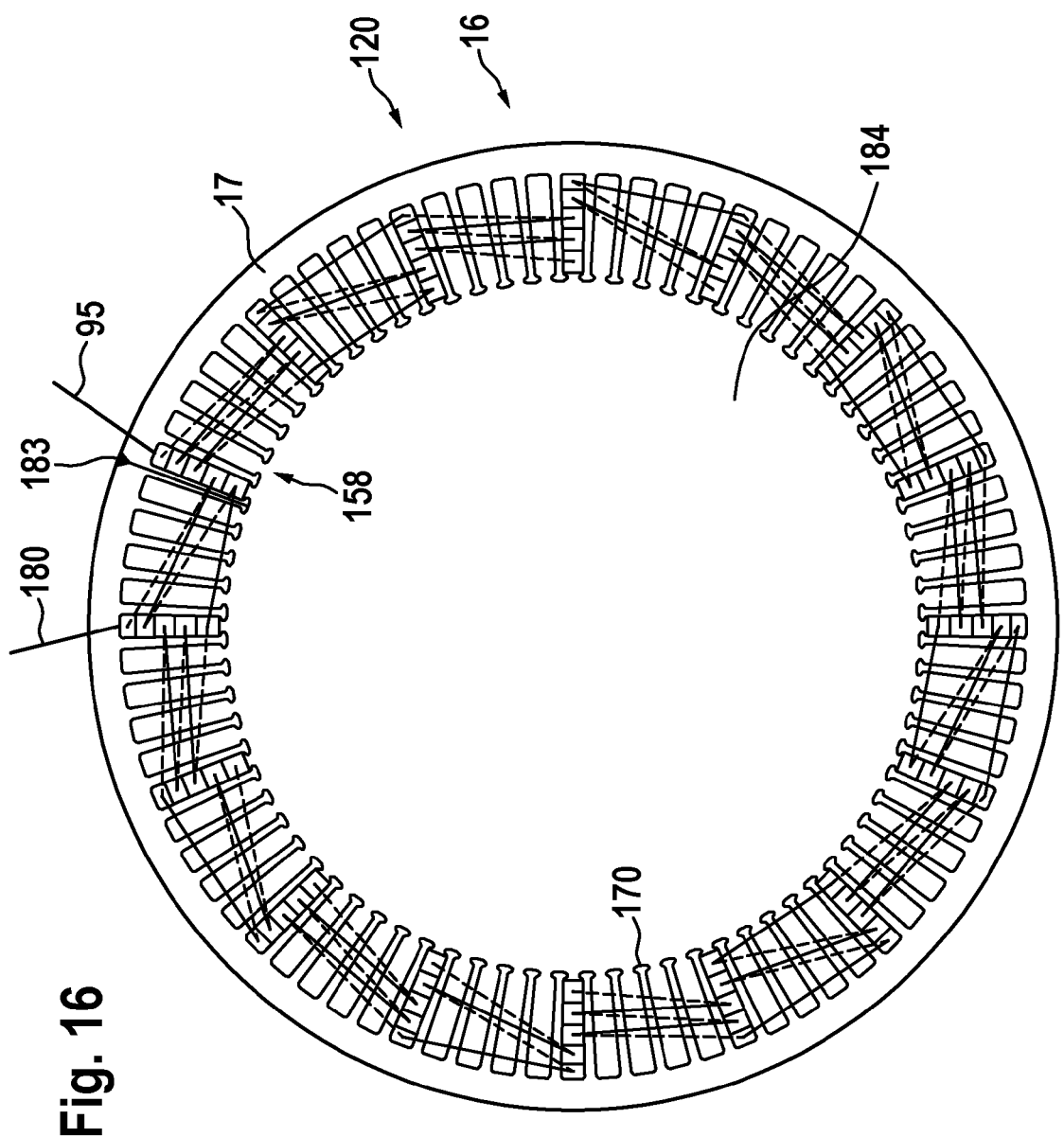
FIG. 16 shows the position of the phase winding from FIG. 15a in the stator core which has been bent to be round.

While the arrangement illustrated in FIG. 13 has a stator core 17 and a stator 16 which has five phases which are arranged in 80 slots with six conductors in each slot, that is to say six coil sides 88 in each slot, FIG. 16 likewise illustrates a five-phase stator 16 in an entirely analogous manner, whose phase windings 120 to 124 are arranged in 80 slots with five coil sides 88 in each slot 158.

FIG. 16 shows that view of the stator 16 which is normally associated with a rectifier. The side opposite the rectifier is normally that side, the one input drive side, that is to say facing an end frame, which is closest to a pulley disk, in any case an input drive for the rotor.

Figure 17:
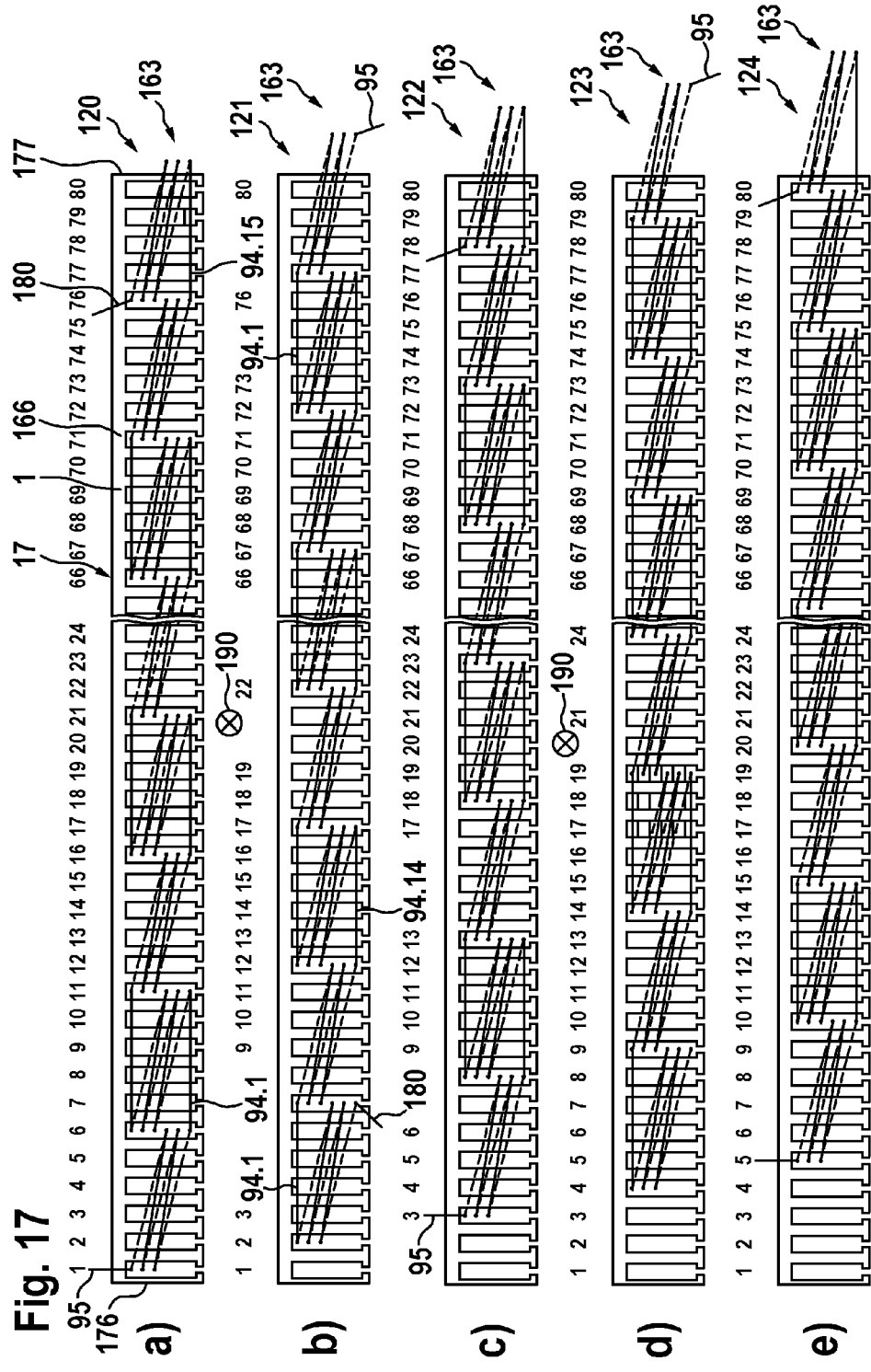
FIG. 17 shows a further alternative position of the phase windings 120 to 124.

With reference to FIG. 17, the following text describes how the phase windings 120 to 124 can be inserted into the stator core 17 alternatively to one another. While, in FIG. 17a, the phase winding 120 is inserted in precisely the same way as is the case in FIG. 12a, in comparison to FIG. 12b, those coil sides of the phase winding 121 which previously formed the winding overhang 163 are inserted into the second slot, with the phase connection 95 and the connection 180 being arranged on the same side of the stator core 17 as are the connections 95 and 180, respectively, of the phase winding 120. In other words: although the phase winding 121 is produced in precisely the same way as the phase winding 120, it is, however, rotated, to be precise through 180°, about an axis 190 which is oriented in the stacking direction of the laminates 166.

Once again, the phase winding 122 is inserted into the stator core 17 in precisely the same way as is the case in FIG. 12c as well; the phase winding 123 is once again rotated about the axis 190 with respect to the phase winding 120, and is at the same time once again inserted into the stator core 17, starting in the fourth slot, as in FIG. 12d. As can be seen from FIG. 17b, the phase winding 121 likewise starts in the second slot, in the same way as the phase winding 121 shown in FIG. 12b. The phase winding 124 is arranged in precisely the same way as in FIG. 12e. Once again, the phase windings 121 to 124 have winding overhangs 163 which occupy the same slots and extend to the same slot positions as in the case of the exemplary embodiment shown in FIG. 12. However, the winding overhangs of the phase windings 121 and 123 are of different design, and each have a phase connection 95.

According to the exemplary embodiment shown in FIG. 17, starting from the respective end 176 or 177, there are in each case n phase connections 95 in the slots 158 in the area of the end 176. The phase connections 180 are distributed in the slots 158 in the area of the end 177 and in the area of the end 176.

FIGS. 18a to d show two different exemplary embodiments of end windings 152 on that side of the stator 16 which is closest to the rectifier. For example, an end winding 152 can be provided radially on the outside such that a coil connector 94.2 in a group of coil connectors 94.2 which connect the first coils 82.1 to second coils 82.2 is not triangular, in the same way as the others, but is quadrilateral. By way of example, on the inside of this end winding 152, the intermediate spaces between the limbs on one side of triangular coil connectors 94.1 are closed with an encapsulation 300 or with an adhesive layer 303. However, it is also possible to close all the intermediate spaces in a group of coil connectors 94.3. Both can be embodied as alternatives.

Figure 18:
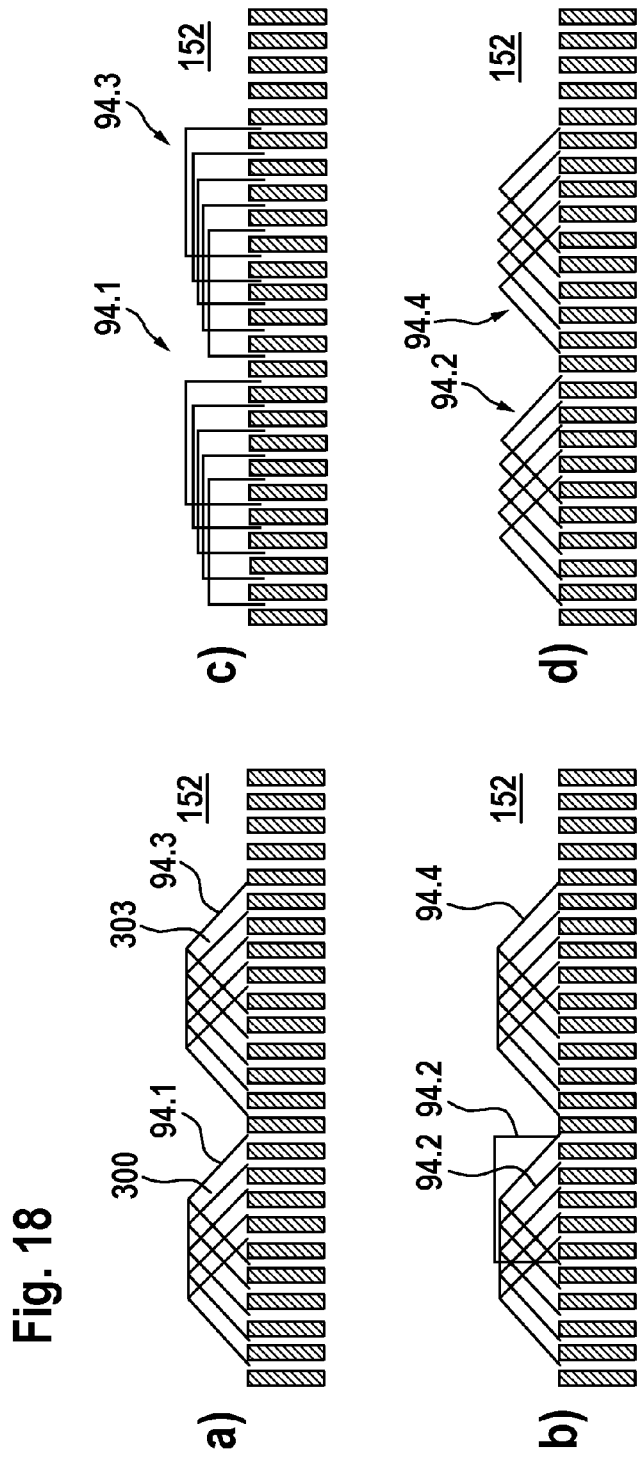
FIG. 18 shows various coil connectors on the same end windings.

FIGS. 18c and 18d show various arrangements of coil connectors 94. For example, in the exemplary embodiment illustrated there, only rectangular coil connectors 94.1 and 94.3 are formed on the inside of the end winding 152, and are furthermore staggered or stepped (increasing maximum deflection of the end winding). In contrast, the coil connectors 94.2 and 94.4 radially on the outside are uniform and triangular.

Figure 19:
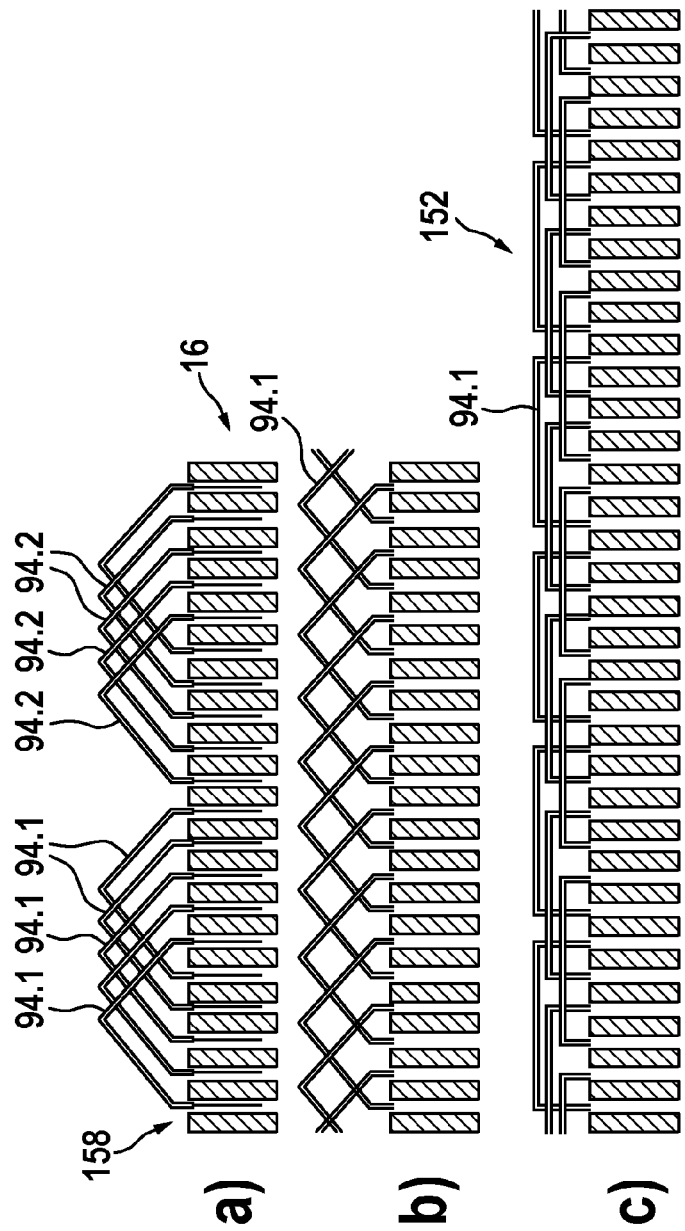
FIGS. 19a to c show various embodiments of coil connectors.
Figure 20:
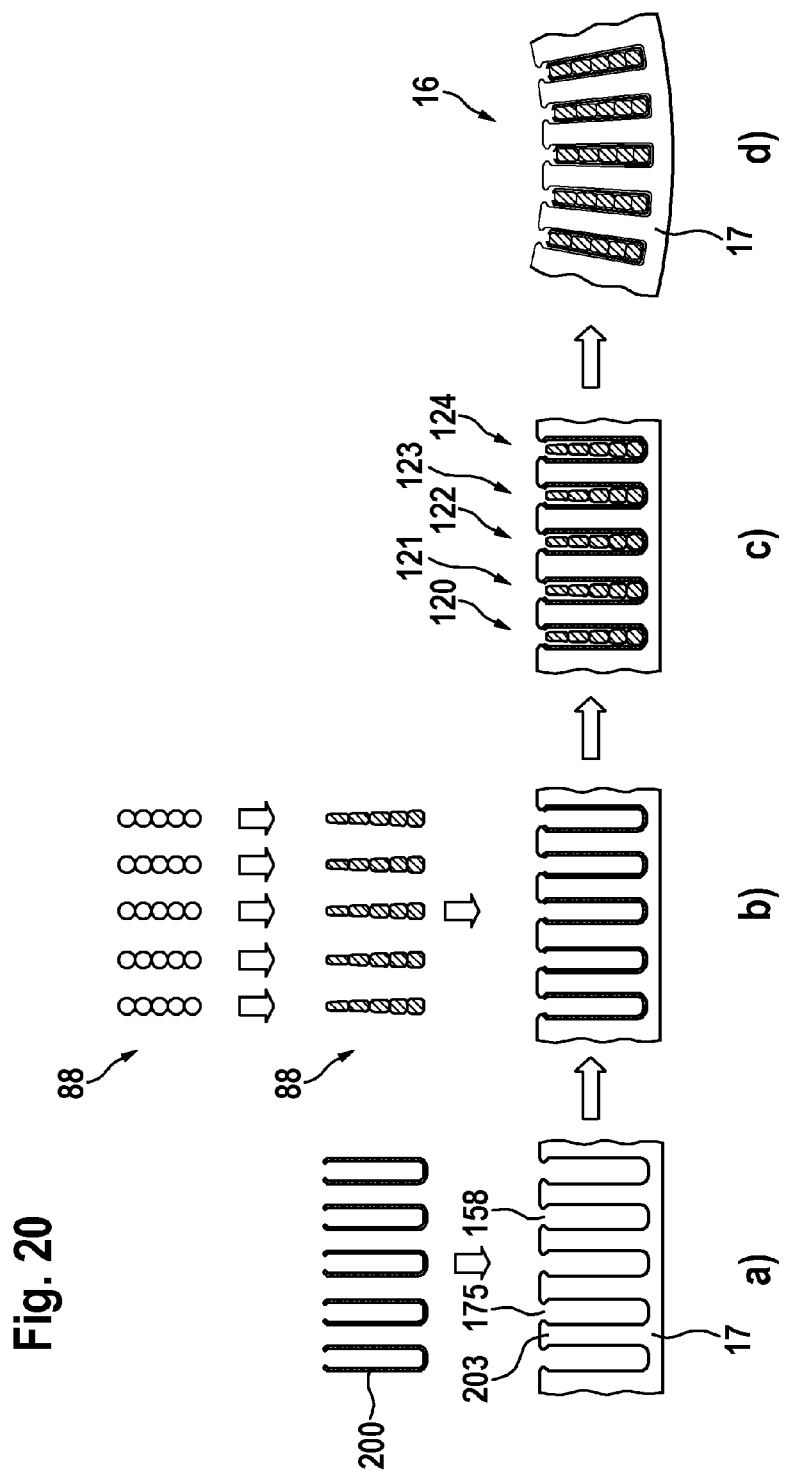
FIG. 20 shows a sequence for introducing the winding into the stator core.

FIG. 19 shows a view of a stator core 17 as shown in FIGS. 12a to 12b, according to which the phase windings 120 to 124 have been inserted into the stator core 17. The corresponding detail shows the slots 158 at the position 6 up to and including the slot 158 at the position 25. In this case, the coil connectors 94.1 and 94.2 are configured such that they extend axially outward in a triangular shape. Each coil connector 94.1 crosses other coil connectors 94.1 a total of four times. This also applies to the coil connectors 94.2 in FIG. 17a. The coil connectors 94.1 may but need not be triangular, as shown in FIG. 19a, but may just as well be curved (semicircular). In any case, these curved coil connectors would likewise cross adjacent coil connectors 94 a total of four times.

The exemplary embodiment shown in FIG. 19b illustrates the situation for a stator core 17 having the phase windings 121 to 124 as shown in FIG. 17. The coil connectors 94.1 are distributed uniformly over the circumference of the stator core 17 and, also in the flat state, over the entire length of the stator core 17. By way of example, this has the advantage that there are no discontinuities on the circumference of the stator, as a result of which the noise that is developed is fairly uniform. FIG. 19c shows a modification of the exemplary embodiment shown in FIG. 19b, according to which the coil connectors 94.1 project in a rectangular shape on one side out of the slots 158, and assume different positions in the axial direction on the other side. This has the advantage that the so-called end winding or end winding areas 152 does or do not extend so much in the radial direction. The end winding or the end winding area 152 has a smaller radial extent than the exemplary embodiments shown in FIGS. 19a and 19b.

FIGS. 20a to d show the various assembly sequences. For example, provision is initially made for the insulation films 200 to be inserted into the slots 158 after the provision of the stator core 17. In one preferred embodiment, insulation films are designed such that their ends which are directed in the direction of a tooth head 203 still end in the slot 158 underneath the tooth head 203, without narrowing the slot opening 175, see also FIG. 20b. After the insertion of the insulation film, the phase windings 120 to 124 are inserted into the already insulated stator core 17. The cross sections of the core sides 88 of the phase windings 120 to 124 have previously been shaped and, in the process, the cross section has been matched to the slot shape, with the stator core 17 in the bent round state. The aim of shaping of the wire which is round in the initial state is not to radially enlarge the end winding 152. In consequence, it is provided that those coil sides which are intended for a slot 158 have a height h2 over their entire radial extent, which height h2 is greater after the shaping or stamping of the coil sides 88 of a slot than the height h1 of the totality of the coil sides 88 which are intended for one slot 158. The height h1 is in this case the sum of the unstamped coil sides 88.1 to 88.5 (copper cross section with a lacquer or resin insulation). After the insertion, FIG. 20c, of the coil sides 88 of the phase windings 120 to 124, the stator core 17 is bent round, thus creating a cylindrical or annular-cylindrical stator core and, overall, a stator 16.

Figure 21:
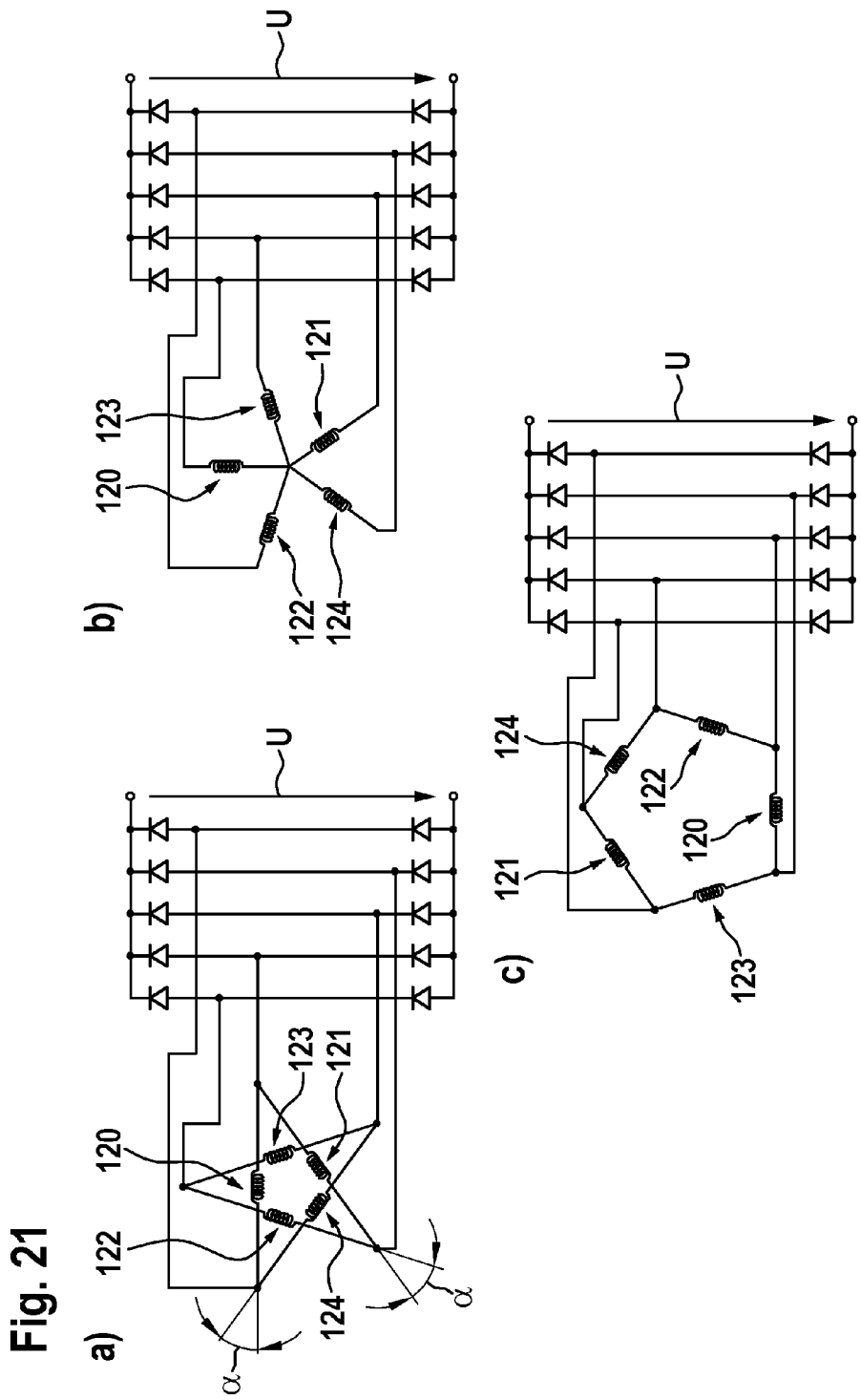
FIGS. 21a to c show three different types of connection of five-phase windings.

As shown in FIGS. 21a, b and c, different types of connection to one another are provided for the phase windings 120 to 124 for a five-phase stator winding 18, and a rectifier circuit is provided. As shown in FIG. 21a, a so-called magic-symbol circuit (five-phase pentagram circuit or circuit in the form of a five-pointed star) is provided, and according to FIG. 21b a five-phase star circuit is provided, with a five-phase pentagon circuit or five-phase ring circuit being provided according to FIG. 21c.

The stator winding 18 of the electrical machine 10 is intended to be equipped with n phase windings 120, 121, 122, 123, 124, in which case at least one phase winding 120, 121, 122, 123, 124 is intended to be produced according to one of the already described exemplary embodiments.

A stator 16 is provided for an electrical machine 10, with this stator 16 having a stator core 17 and the stator core 17 having a substantially central opening 184, having slots 158 and teeth 170 in the stator core 17, which are open radially inward toward the central opening 184, having a stator winding 18 with a specific number n, greater than unity, of phase windings 120, 121, 122, 123, 124, with sections of a phase winding 120, 121, 122, 123, 124 being arranged in a plurality of slots 158 and, in this case, with coils 82 with coil sides 88 being arranged in a plurality of slots 158, with a plurality of coil sides 88 of a coil 82 having a plurality of turns 85 being inserted, stacked one on top of the other, into a slot, and with a plurality of other coil sides 88 of the coil 82 being inserted into another slot 158 and being stacked, wherein a stator winding 18 is located in the slots of the stator 16, as described.

Alternatively, the stator can also be described as follows: a stator 16 is provided for an electrical machine 10, with this stator 16 having a stator core 17 and the stator core 17 having a substantially central opening 184, having slots 158 and teeth 170 in the stator core 17, which are open radially inward toward the central opening 184, having a stator winding 18 with a specific number n, greater than unity, of phase windings 120, 121, 122, 123, 124, with sections of a phase winding 120, 121, 122, 123, 124 being arranged in a plurality of slots 158 and, in this case, with coils 82 with coil sides 88 being arranged in a plurality of slots 158, with a plurality of coil sides 88 of a coil 82 having a plurality of turns 85 being inserted, stacked one on top of the other, into a slot, and with a plurality of other coil sides 88 of the coil 82 being inserted into another slot 158 and being stacked, with the phase winding 120, 121, 122, 123, 124 having a plurality of such coils 88.1, 88.2 which are integrally connected to one another directly successively, with two coils 82.1, 82.2 which are integrally connected to one another directly successively being connected to one another on an internal circumference of the stator core 17 by a single-layer coil connector 94.1, and with two coils 82.2, 82.3 which are integrally connected to one another directly successively being connected to one another on an external circumference of the stator core 17 by a single-layer coil connector 94.2.

Preferably, the number of conductors z per slot in the phase windings 120 to 124 should be 6, and the wire diameter should in this case be d=1.95 mm, with the insulation being designed for level 2. In this case, the wire originally has a round cross section and is stamped to a slot shape or slot shape section which corresponds to its slot position. The filling factor, that is to say the ratio of the wire cross sections located in a slot including the wire insulation (lacquer, resin) to the slot cross section (iron) should be less than 75%.

Figure 22:
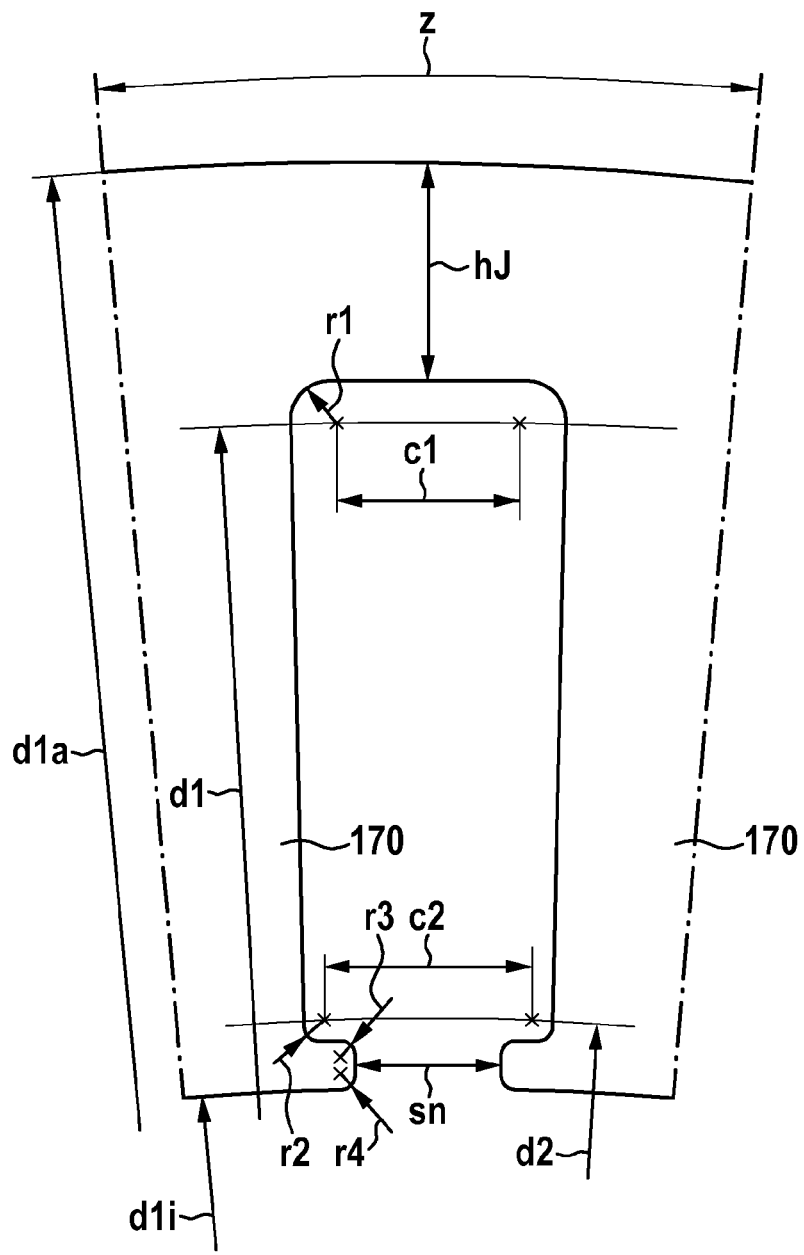
FIG. 22 shows a schematic slot cross section.

As shown in FIG. 22, a slot cross section has the following dimensions:

$d1a$=140 mm, $d1i$=106 mm, the axial length le (in the rotation axis direction of the rotor) should be 37 mm. The total number of slots 158 should be 80. In one special embodiment, the angle z for 79 slots should be approximately 4.51°. The diameters d1 and d2 should be 131.3 mm and 108 mm, respectively. The distances c1 and c2 between centers of the symmetrical slot 158 are 2.2 and 1.6 mm, respectively. The radii r1 and r2, which are each 0.3 mm, originate from these distances between centers, that is to say from the respective end points of the two indicated lengths. The slot opening has a width of 1.45 mm. The slot opening is rounded with a radius r3=0.3 mm on the side facing the slot 158; toward the internal diameter, the slot opening is rounded with a radius r4=0.3 mm. The maximum width of a tooth at the tooth head is 2.04 mm. The slot pitch Tau1 at the slot base is 5.16 mm, while the slot pitch Tau2 at the tooth head is 4.24 mm. In the vicinity of the slot base, the tooth width is bz1=2.36 mm. The tooth width in the vicinity of the slot base is measured at right angles to the radial direction from the center of the tooth at the point at which the tooth merges with a radius r2 into the curvature of the tooth head. The yoke height hJ is 4.05 mm. For the copper area (conductor without any insulation), this therefore results in an area of 17.9 mm² for a slot area of 30.5 mm². This therefore results in a copper filling factor of 58.8.

Figure 23:
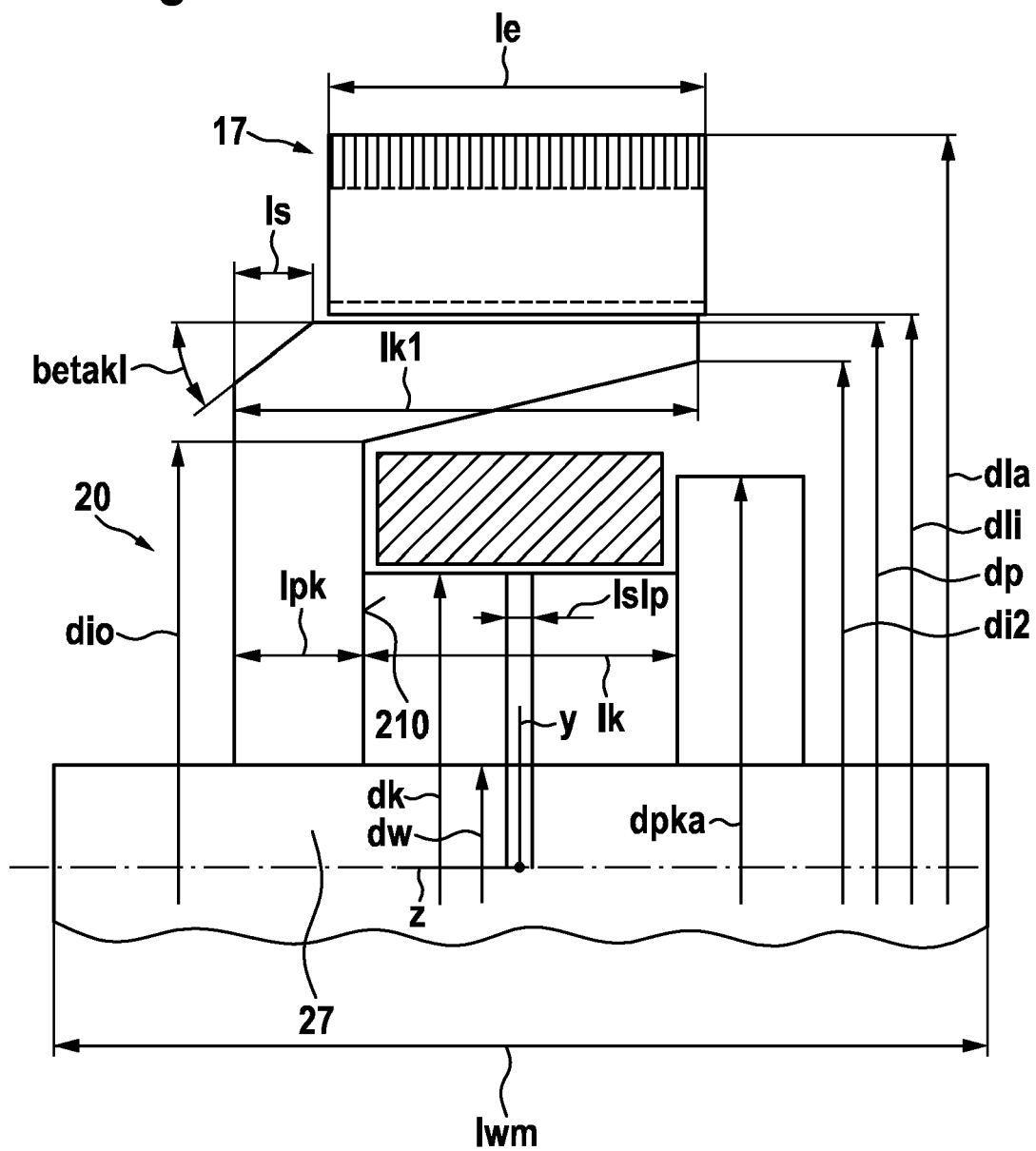
FIG. 23 shows a schematic longitudinal section through a rotor and a stator core.

FIG. 23 shows a schematic longitudinal section through the stator core 17 and the rotor 20. The external diameter dp is intended to be 105.3 mm, and the diameter of the shaft 27 is intended to be 17 mm. The number of poles, that is to say the number of claws, is intended to be 16. The other indicated variables are the pole core diameter dk, the pole core length lk, the plate thickness lpk of a claw pole, a chamfer which is defined on the one hand by the angle betakl and the length ls, the internal diameter di2 at the claw tip, the diameter dpka in the intermediate space between two claw poles, and a diameter at the theoretical intersection between the underneath of the claw pole and the inner end surface 210 of a plate.

The invention claimed is:

1. A method for producing a stator winding (18) of an electrical machine (10), wherein the stator winding (18) has at least n phase windings (120, 121, 122, 123, 124) and a phase winding (120, 121, 122, 123, 124) has a plurality of directly successive wound coils (82) including at least a first coil (82.1) and a second coil (82.2) directly adjacent the first coil (82.1) with a coil connector (94.1) provided integrally therebetween, the method comprising:

winding each of the coils (82) with a plurality of turns (85), each turn (85) including a pair of parallel coil sides (88) integrally connected with a corresponding coil side connector (91);

shaping each of the first and second coils (82.1, 82.2) after winding of the turns (85) such that all of the coil sides (88) of the first coil (82.1) and all of the coil sides (88) of the second coil (82.2) are arranged in-plane with one another;

rotating the first and second coils (82.1, 82.2) in mutually opposite directions, each of the first and second coils (82.1, 82.2) being rotated through 90 angular degrees with respect to the coil connector (94.1) such that a plane containing the coil sides (88) of the first coil (82.1) is parallel to and spaced from a plane containing the coil sides (88) of the second coil (82.2);

providing a shaping tool (100), in which slots (105, 106; 105', 106') are provided which are suitable for holding the coils (82); and arranging the first coil (82.1) in one slot (105; 105') of the shaping tool (100), arranging the second coil in another slot (105; 105') of the shaping tool (100), and arranging n−1 slots (105, 106; 105', 106') of the shaping tool (100) between the first coil (82.1) and the second coil (82.2).

2. The method as claimed in claim 1, characterized in that each coil (82) is wound with an even or odd number of turns (85).

3. The method as claimed in claim 1, characterized in that one coil (82) is wound with an even number of turns (85), and another coil (82) is wound with an odd number of turns (85).

4. The method as claimed in claim 3, characterized in that one coil (82) is a first coil (82.1) and the other coil (82) is a second coil (82.2), with n−1 slots 105, 106; 105', 106') being arranged between the first coil (82.1) and the second coil (82.2).

5. The method as claimed in claim 1, characterized in that the turns (85) of a coil (82) are located at least partially one on top of the other.

6. The method as claimed in claim 1, characterized in that one or more phase windings (121, 122, 123, 124, 125) are inserted into slots (105, 106; 105', 106') of the shaping tool (100), and in that one group (133) of the coil sides (88) is shifted with respect to another group (130) of the coil sides (88) of the same coil (82) and is shaped such that n−1 slots (105, 106; 105', 106') are arranged between the two groups (130, 133) of the coil sides (88).

7. The method as claimed in claim 6, characterized in that the shaping tool (100) has a lower part (101), which is provided with slots (105, 105'), and an upper part (102), which is provided with slots (106, 106'), with the slots (105, 106) having either the same slot depth or different slot depths.

8. The method as claimed in claim 1, characterized in that the coil sides (88) of a coil (82) are stamped in a stamping tool (186).

9. The method as claimed in claim 8, characterized in that different coil sides (88) are stamped differently.

10. The method as claimed in claim 8, characterized in that the coil sides (88) are stamped after winding or after movement.

11. The method as claimed in claim 8, characterized in that the coils (82) are provided with a stamped junction area (149) between coil sides (88) and coil side connectors (91).

* * * * *